US012562056B2

(12) United States Patent
Li

(10) Patent No.: US 12,562,056 B2
(45) Date of Patent: Feb. 24, 2026

(54) INFORMATION PROCESSING METHOD AND DEVICE

(71) Applicant: SHENZHEN YINWANG INTELLIGENT TECHNOLOGIES CO., LTD., Shenzhen (CN)

(72) Inventor: Tianze Li, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 89 days.

(21) Appl. No.: 18/398,606

(22) Filed: Dec. 28, 2023

(65) Prior Publication Data

US 2024/0135809 A1 Apr. 25, 2024
US 2024/0233529 A9 Jul. 11, 2024

Related U.S. Application Data

(63) Continuation of application No. PCT/CN2022/102432, filed on Jun. 29, 2022.

(30) Foreign Application Priority Data

Jul. 2, 2021 (CN) .......................... 202110751053.7

(51) Int. Cl.
G08G 1/09 (2006.01)
G08G 1/01 (2006.01)
H04W 4/021 (2018.01)
H04W 4/44 (2018.01)

(52) U.S. Cl.
CPC .......... *G08G 1/093* (2013.01); *G08G 1/0116* (2013.01); *H04W 4/021* (2013.01); *H04W 4/44* (2018.02)

(58) Field of Classification Search
CPC .... G08G 1/093; G08G 1/0116; G08G 1/0967; G08G 1/096783; H04W 4/021; H04W 4/44; H04W 4/48
See application file for complete search history.

(56) References Cited

U.S. PATENT DOCUMENTS

| | | | | |
|---|---|---|---|---|
| 2018/0257615 A1* | 9/2018 | Rawashdeh | .......... | G06V 20/584 |
| 2019/0294966 A1* | 9/2019 | Khan | .................. | G06N 3/0464 |
| 2020/0004268 A1 | 1/2020 | Park | | |

FOREIGN PATENT DOCUMENTS

| | | |
|---|---|---|
| CN | 106023627 A | 10/2016 |
| CN | 106327897 A | 1/2017 |
| CN | 107767679 A | 3/2018 |
| CN | 108335510 A | 7/2018 |

(Continued)

OTHER PUBLICATIONS

Extended European Search Report in European Appln No. 22832120.4, dated Aug. 14, 2024, 8 pages.

(Continued)

*Primary Examiner* — An T Nguyen
(74) *Attorney, Agent, or Firm* — Fish & Richardson P.C.

(57) ABSTRACT

This application provides example information processing methods and example devices. In one example method, a vehicular device in the vehicle receives a first message from a road side device, where the first message includes first position information of at least one first signal light, and the first message is a MAP message or a signal phase and timing (SPAT) message. The vehicular device determines a position of a target signal light based on the first position information.

16 Claims, 15 Drawing Sheets

(56) References Cited

FOREIGN PATENT DOCUMENTS

| CN | 108694841 A | 10/2018 |
| CN | 113903181 A | 1/2022 |
| EP | 3267418 A1 | 1/2018 |

OTHER PUBLICATIONS

T/CSAE 53-2017, "Cooperative intelligent transportation system; vehicular communication; application layer specification and data exchange standard" Sep. 18, 2017, 138 pages.

International Search Report and Written Opinion in International Appln. No. PCT/CN2022/102432, mailed on Sep. 9, 2022, 18 pages (with English translation).

* cited by examiner

Road side device

Terminal device

Road side end | Terminal device

1401

1402

1403

INFORMATION PROCESSING METHOD AND DEVICE

CROSS-REFERENCE TO RELATED APPLICATIONS

This application is a continuation of International Application No. PCT/CN2022/102432, filed on Jun. 29, 2022, which claims priority to Chinese Patent Application No. 202110751053.7, filed on Jul. 2, 2021. The disclosures of the aforementioned applications are hereby incorporated by reference in their entireties.

TECHNICAL FIELD

This application relates to the field of connected vehicles, and in particular, to an information processing method and a device.

BACKGROUND

With the development of science and technology and the rapid progress of society, people's living standards are gradually improved, and cars have almost become a necessary transportation means for people to travel, greatly facilitating people's life. Cars bring convenience to people, but also cause some social problems, such as traffic congestion at intersections and frequent traffic accidents. Based on the foregoing social problems, a vehicle to everything (V2X) communication technology emerges. V2X includes communication between a vehicle and road side infrastructure (vehicle to infrastructure, V2I), and communication between a vehicle and all road users such as another vehicle, a truck, a motorcycle, and a pedestrian. The V2X communication technology is widely used in real life. For example, a road side unit (RSU) broadcasts a signal light state and other road condition information to surrounding vehicles by using a V2I message, so that the vehicles may obtain the road conditions ahead in advance, thereby reducing an accident rate and improving traffic efficiency accordingly.

Currently, a plurality of V2I message types are defined in a standard to meet requirements of different application scenarios. For example, in a scenario in which a vehicle learns a state of a signal light at an intersection by using a V2I message, a map data (MAP) message and a signal phase and timing (SPAT) message may meet the scenario requirement. The MAP message is used to transmit a plurality of types of geographical road information, and the SPAT message is used to transmit current state and time information of one or more signal lights at the intersection. However, in many scenarios, reliability of V2X communication cannot be ensured. Especially, when there is blocking between both communication parties or a vehicle speed is relatively high, a message received by a vehicle may not be an actual situation of a signal light at a current moment. In this case, the vehicle makes an incorrect judgment, and a safety accident easily occurs.

The conventional technology further provides another visual perception manner to assist a vehicle in recognizing a signal light state at an intersection. To be specific, a camera equipped on the vehicle is used to collect an image of an intersection in front of the vehicle, and the signal light state is recognized by using an image recognition capability. However, real scenarios are complex, and in some scenarios, a signal light at a current intersection cannot be accurately recognized by using an image recognition function. For example, a shot image may include signal lights at a plurality of intersections or a vehicle light at a relatively high height, and a signal light at another intersection or a taillight may be easily recognized as the signal light at the current intersection. Consequently, false recognition is caused.

Therefore, an information processing method is urgently required, to improve accuracy of recognizing a signal light state at an intersection by a vehicle.

SUMMARY

This application provides an information processing method and a device, to improve accuracy of recognizing a state of a signal light at an intersection by a vehicle.

According to a first aspect, this application provides an information processing method. The method may be applied to a vehicular device end in a vehicle. For example, the method may be performed by an information processing apparatus on the vehicular device end. The method includes: receiving a first message from a road side device, where the first message includes first position information of at least one first signal light, and the first message is a map MAP message or a signal phase and timing SPAT message; and determining a position of a target signal light based on the first position information.

According to this method, the vehicular device may obtain the first position information of the at least one first signal light from the first message received by the road side device, and may determine the position of the target signal light based on the first position information, so as to assist the vehicular device in accurately recognizing the target signal light in collected image data, so that a V2I message and visual information can be matched and fused, thereby improving accuracy of recognizing a state of a signal light at an intersection by a vehicle, and avoiding passive blind listening.

In a possible implementation, the first message is the MAP message, and the first position information is located in a Seq. of Connection field of the MAP message. The position of the target signal light may be accurately determined by using the first position information carried in the Seq. of Connection field of the MAP message.

In a possible implementation, the first message is the SPAT message, and the first position information is located in a Seq. of Phase field of the SPAT message. The position of the target signal light may be accurately determined by using the first position information carried in the Seq. of Phase field of the SPAT message.

In a possible implementation, the first message is the SPAT message, the SPAT message further includes identification information of the at least one first signal light, and the method further includes: receiving the MAP message from the road side device, where the MAP message includes the identification information. By using the first position information and the identification information that are carried in the SPAT message and the identification information that is carried in the MAP message, the identification information may be used as a connection between the MAP message and the SPAT message. Therefore, the position information in the SPAT message may be obtained by using the identification information in the MAP message, so as to determine the position of the target signal light.

In a possible implementation, a Seq. of IntersectionState field of the SPAT message includes the first position information and the identification information, and a Seq. of connection field of the MAP message includes the identification information.

In a possible implementation, the method further includes: obtaining second position information from a sensing device, where the second position information indicates a position of at least one second signal light; and the determining a position of a target signal light based on the first position information includes: determining the position of the target signal light based on the first position information and the second position information. In this way, the position of the target signal light is determined with reference to the first message and the position information that is obtained by the sensing device, so that accuracy of determining the position of the target signal light can be improved.

According to a second aspect, this application provides an information processing method. The method may be applied to a road side device end. For example, the method may be performed by an information processing apparatus on the road side device end. The method includes: generating a first message, where the first message includes position information of at least one signal light, and the first message is a map MAP message or a signal phase and timing SPAT message; and sending the first message.

According to this method, the first message sent by the road side device to the vehicular device includes the position information of the at least one first signal light, so that the vehicular device can determine the position of the target signal light based on the position information, so as to assist the vehicular device in accurately recognizing the target signal light in collected image data, so that a V2I message and visual information can be matched and fused by the vehicular device, thereby improving accuracy of recognizing a state of a signal light at an intersection by a vehicle, and avoiding passive blind listening.

In a possible implementation, the first message is the MAP message, and the position information is located in a Seq. of Connection field of the MAP message. The first position information is added to the Seq. of Connection field of the MAP message, so that the position of the target signal light can be accurately determined.

In a possible implementation, the first message is the SPAT message, and the first position information is located in a Seq.of Phase field of the SPAT message. The first position information is added to the Seq. of Phase field of the SPAT message, so that the position of the target signal light can be accurately determined.

In a possible implementation, the first message is the SPAT message, and the SPAT message further includes identification information of the at least one signal light. The method further includes: sending the MAP message, where the MAP message includes the identification information. The first position information and the identification information are added to the SPAT message, and the identification information is added to the MAP message. The identification information may be used as a connection between the MAP message and the SPAT message, so that the vehicular device can obtain the position information in the SPAT message by using the identification information in the MAP message, so as to determine the position of the target signal light.

In a possible implementation, a Seq.of IntersectionState field of the SPAT message includes the first position information and the identification information, and a Seq. of connection field of the MAP message includes the identification information.

Corresponding to any information processing method in the first aspect and the second aspect, this application further provides an information processing apparatus. The information processing apparatus may be any transmit end device or receive end device that transmits data in a wireless manner, for example, a vehicular device or road side device end. In a communication process, the transmit end device and the receive end device are opposite to each other. In some communication processes, the information processing apparatus may be used as the foregoing vehicular device or a communication chip that may be used in the vehicular device. In some communication processes, the information processing apparatus may be used as the foregoing road side device end or a communication chip that may be used in the road side device end.

According to a third aspect, this application provides an information processing apparatus. The apparatus includes a communication unit and a processing unit, to perform any implementation of any method in the first aspect and the second aspect. The communication unit is configured to perform functions related to sending and receiving. Optionally, the communication unit includes a receiving unit and a sending unit. In a design, the information processing apparatus is a communication chip, and the communication unit may be an input/output circuit or a port of the communication chip.

In another design, the communication unit may be a transmitter and a receiver, or the communication unit may be a transmitter machine and a receiver machine.

Optionally, the information processing apparatus further includes each module that may be configured to perform any implementation of any method in the first aspect and the second aspect.

According to a fourth aspect, this application provides an information processing apparatus. The information processing apparatus may be a vehicular device or a road side device of the foregoing vehicle, and includes a processor and a memory. Optionally, the apparatus further includes a transceiver. The memory is configured to store a computer program, and the processor executes the computer program to implement any implementation of any information processing method in the first aspect and the second aspect.

Optionally, there are one or more processors, and there are one or more memories.

Optionally, the memory may be integrated with the processor, or the memory and the processor are separately disposed.

Optionally, the transceiver may include a transmitter machine (transmitter) and a receiver machine (receiver).

According to a fifth aspect, this application provides an information processing apparatus, including a processor. The processor is coupled to a memory, and may be configured to perform the method in any one of the first aspect and the second aspect and any one of the possible implementations of the first aspect and the second aspect. Optionally, the information processing apparatus further includes a memory. Optionally, the information processing apparatus further includes a communication interface, and the processor is coupled to the communication interface.

In an implementation, the information processing apparatus may be a vehicular device. When the information processing apparatus is the vehicular device, the communication interface may be a transceiver or an input/output interface. Optionally, the transceiver may be a transceiver circuit. Optionally, the input/output interface may be an input/output circuit.

In another implementation, the information processing apparatus may be a road side device. When the information processing apparatus is the road side end, the communication interface may be a transceiver or an input/output interface. Optionally, the transceiver may be a transceiver circuit. Optionally, the input/output interface may be an input/output circuit.

In still another implementation, the information processing apparatus is a chip or a chip system. When the information processing apparatus is the chip or the chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to a sixth aspect, this application provides a system, and the system includes a vehicular device and a road side device of the foregoing vehicle.

According to a seventh aspect, this application provides a computer program product. The computer program product includes a computer program (which may also be referred to as code or an instruction). When the computer program is run, a computer is enabled to perform the method in any implementation of the first aspect and the second aspect.

According to an eighth aspect, this application provides a computer-readable storage medium. The computer-readable medium stores a computer program (which may also be referred to as code or an instruction). When the computer program is run on a computer, the computer is enabled to perform the method in any implementation of the first aspect and the second aspect.

According to a ninth aspect, a chip system is provided. The chip system may include a processor. The processor is coupled to a memory, and may be configured to perform the method in any one of the first aspect and the second aspect and any one of the possible implementations of any one of the first aspect and the second aspect. Optionally, the chip system further includes a memory. The memory is configured to store a computer program (which may also be referred to as code or an instruction). The processor is configured to invoke a computer program from the memory and run the computer program, so that a device on which the chip system is installed performs the method in any one of the possible implementations of the first aspect and the second aspect.

In a specific implementation process, the information processing apparatus may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is separately used as the input circuit and the output circuit at different moments. Specific implementations of the processor and the various circuits are not limited in embodiments of this application.

DESCRIPTION OF EMBODIMENTS

The following describes the technical solutions in embodiments of this application with reference to the accompanying drawings in embodiments of this application. It is clear that the described embodiments are merely a part rather than all of embodiments of this application.

The information processing method in embodiments of this application may be applied to a plurality of intersection passing scenarios. A specific application scenario is not limited in this application. In the following embodiments, an example in which the information processing method is applied to a traffic light intersection passing scenario is used for description.

Figure 1:
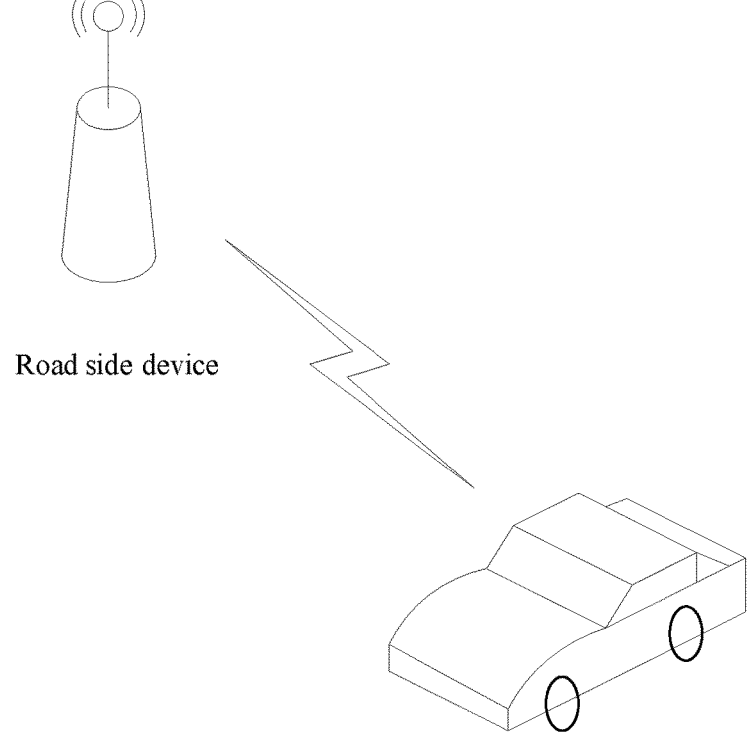
FIG. 1 is a schematic architectural diagram of a communication system to which an embodiment of this application is applicable.

FIG. 1 is a schematic architectural diagram of a possible communication system to which an embodiment of this application is applicable. As shown in FIG. 1, the communication system may include a road side end and a terminal device.

The road side end may include one or more road side devices, and the road side device may be configured to send a V2X message to the terminal device in a communication manner such as direct communication (for example, PC 5) or a dedicated short range communication (DSRC). The V2X message may carry information that needs to be notified to the terminal device. A manner of communication between the road side device and the terminal device may also be referred to as vehicle-to-road side infrastructure V2I communication. A specific deployment form of the road side device is not specifically limited in this application. The road side device may be a terminal device, a mobile or non-mobile terminal device, a server, a chip, or the like.

The terminal device in embodiments of this application may be a vehicle or a non-motor vehicle terminal device having a communication function, a portable device, a wearable device, a mobile phone (or referred to as a "cellular" phone), a portable, pocket-sized, or handheld terminal, a chip in these devices, or the like. The terminal device in this application may be a terminal device applied to the Internet of Vehicles, and the terminal device in this application may also be referred to as an Internet of Vehicles terminal device, an Internet of Vehicles terminal, an Internet of Vehicles communication apparatus, a vehicular terminal device, or the like.

In FIG. 1, an example in which the terminal device is a vehicle is used for description. The vehicle is a typical terminal device in the Internet of Vehicles. In the following embodiments of this application, a vehicle is used as an example for description. Any vehicle in embodiments of this application may be an intelligent vehicle or a non-intelligent vehicle. This is not limited in embodiments of this application. A person skilled in the art should understand that, in this application, an embodiment in which a vehicle is used as an example may be further applied to another type of terminal device. The terminal device may specifically perform a service procedure related to the Internet of Vehicles by using an internal functional unit or apparatus of the terminal device. For example, when the terminal device is a vehicle, one or more of the following apparatuses in the vehicle may be configured to perform a method procedure related to the terminal device in embodiments of this application. The apparatus is, for example, a Telematics Box (TBOX), a mobile data center (MDC), an on board unit (OBU), or an Internet of Vehicles chip. These apparatuses may be placed in the vehicle or installed in the vehicle. For example, the vehicular device may be disposed below a central control screen of the vehicle, or may be disposed at a rear-view mirror, and may be powered by a power supply system of the vehicle. A specific position of the vehicular device is not limited in embodiments of this application.

In embodiments of this application, the vehicle may communicate with another object based on a vehicle to outside wireless communication technology (for example, V2X). For example, communication between the vehicle and the road side device may be implemented based on an inter-vehicle wireless communication technology (for example, V2I). Communication between the vehicle and another object may be performed based on an Internet of Vehicles wireless communication technology on the basis of a long term evolution (LTE) communication technology, a 5th generation (5G) mobile communication technology, a future mobile communication technology, and the like. For example, communication between the vehicle and the road side device may be implemented based on 5G.

Figure 2:
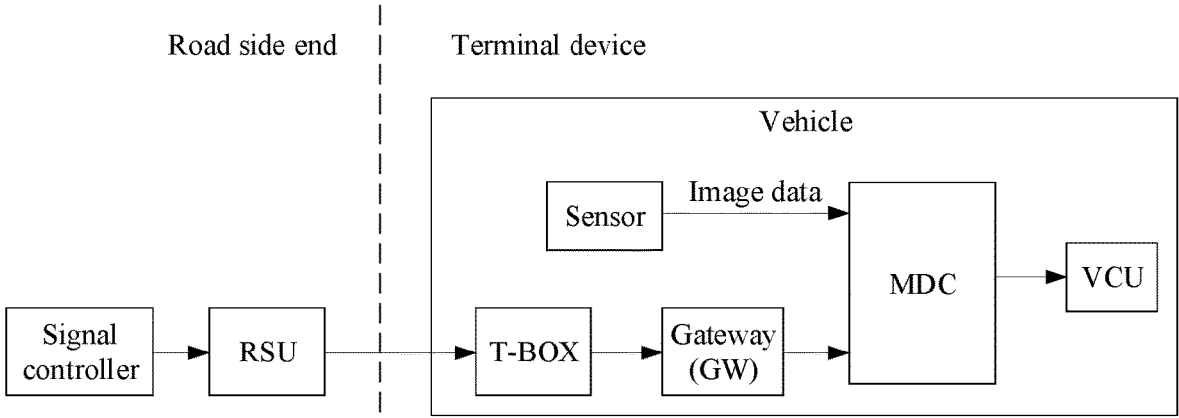
FIG. 2 is a schematic diagram of an application scenario according to an embodiment of this application.

Based on the system architecture shown in FIG. 1, a scenario in which a vehicle needs to learn a state of a signal light at an intersection when arriving at the intersection is used as an example. FIG. 2 is a schematic diagram of an application scenario. As shown in FIG. 2, the scenario includes a road side end and a terminal device. The road side end includes a road side unit (RSU) and a signal controller. The signal controller is configured to control a state change of a traffic signal light (which may also be referred to as a signal light for short) by using a control instruction. The RSU is connected to the signal controller in a wired manner. The signal controller may send the control instruction to the RSU, so that the RSU may obtain related information of the signal light from the signal controller, such as a lane direction, lane steering information, a signal light color, and a remaining time of the signal light. For example, the lane direction may be from west to east, the lane steering information is a left-turn lane, the signal light color is a red light, and the remaining time of the signal light is 10 s. The RSU may sign the obtained information about the signal light, and information such as traffic management and road conditions, and then broadcast the information to the terminal device by using a V2X message (for example, an LTE-V2X message), so that the terminal device obtains traffic information from the V2X message.

As shown in FIG. 2, an example in which the terminal device is a vehicle is used for illustration. The vehicle includes a remote information processor (TBOX), a gateway (GW), a mobile data center (MDC), and a vehicle control unit (VCU). After receiving the V2X message (for example, a V2I message), the TBOX in the vehicle verifies a signature of the V2X message. After signature verification succeeds, the TBOX sends the V2X message to the MDC by using the gateway. The MDC parses the V2X message to obtain a parsing result. The MDC generates control information based on the parsing result, and then sends the control information to the VCU. The VCU executes a corresponding control command based on the received control information.

Currently, five V2I message types are defined in the Cooperative intelligent transportation system-Vehicular communication application layer specification and data exchange standard, to meet requirements of different application scenarios: a basic safety message (BSM), a map data MAP) message, a basic safety message (BSM), a road side safety message (RSM), a signal phase and timing message (SPAT), and a road side information (RSI) message. Two message types are involved in the traffic light intersection passing scenario in this application: the MAP message and the SPAT message. The following describes main structures of the two messages separately.

(1) MAP Message

The MAP message is used to transmit a plurality of types of geographical road information, and content of the MAP message may include a complex intersection description, a road section description, a high-speed curve contour, lane line information, and the like.

Figure 3A:
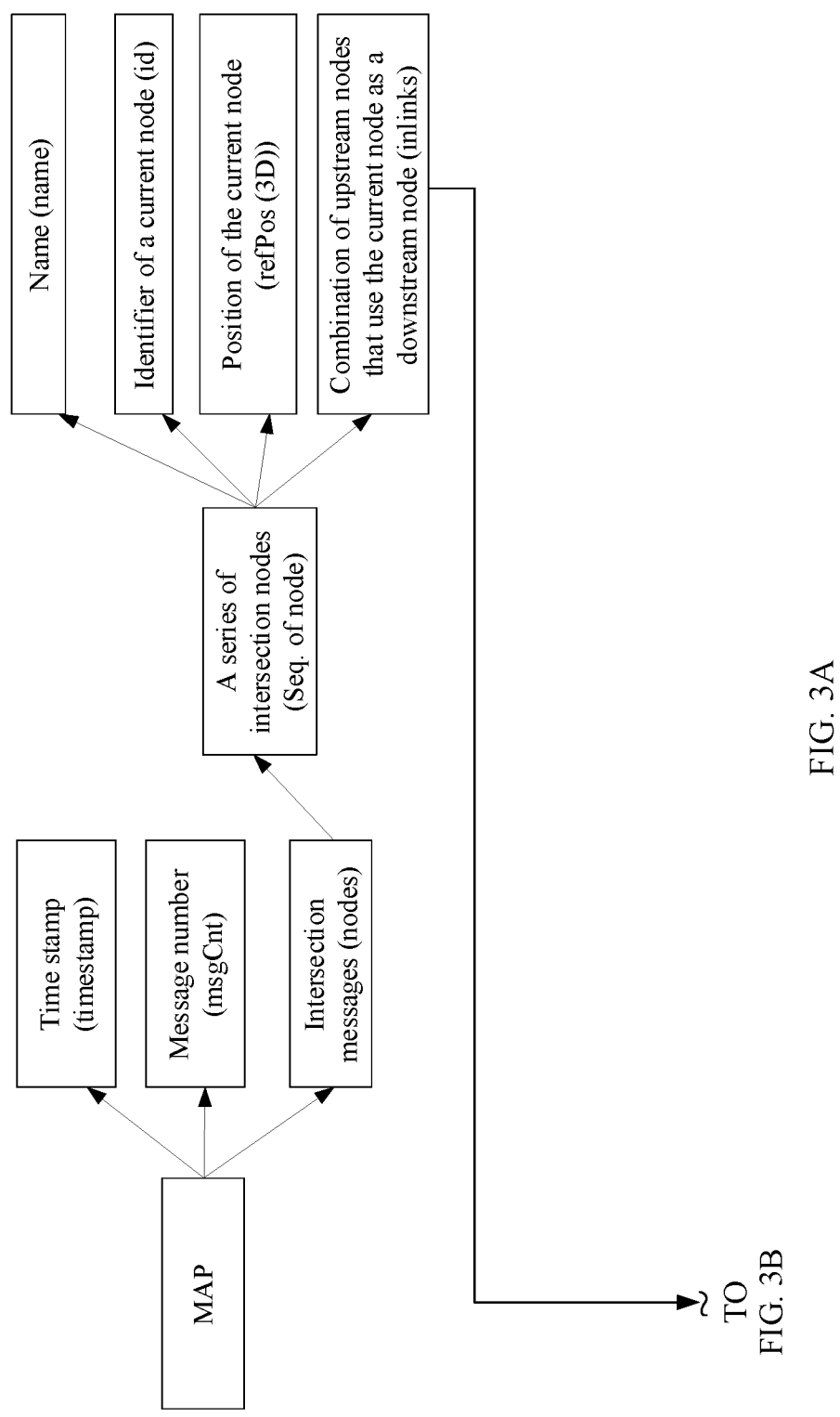
FIG. 3A and FIG. 3B are a schematic diagram of a MAP in the conventional technology.
Figure 3B:
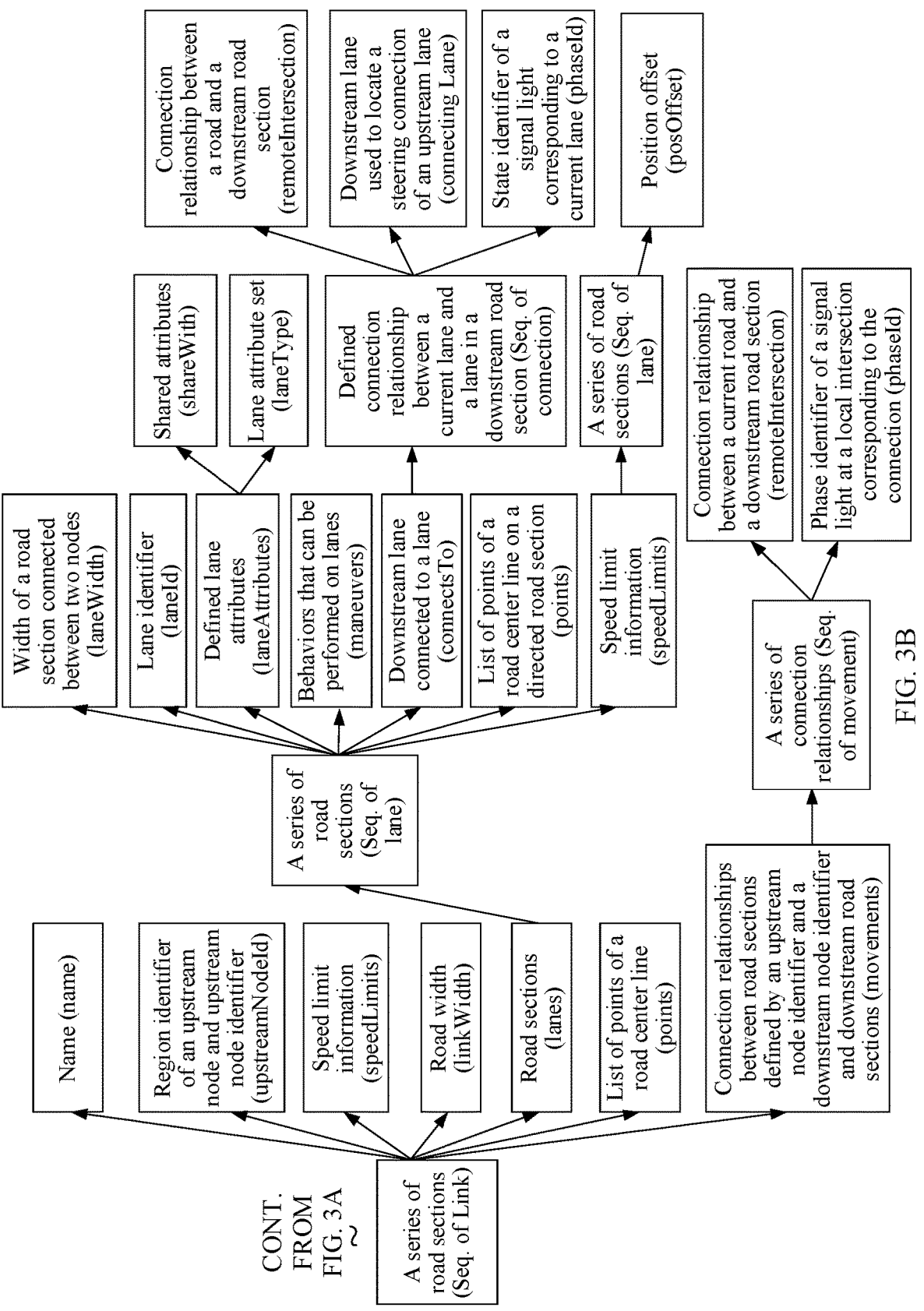

FIG. 3A and FIG. 3B are an example of a schematic diagram of a main structure of a MAP message. As shown in FIG. 3A and FIG. 3B, the main structure of the MAP message is a structure form of layer-by-layer nesting. In FIG. 3A and FIG. 3B, a solid-line box indicates a mandatory option, and a dashed-line box indicates an optional option. The main structure of the MAP message includes a time stamp, a message number (msgCnt), and intersection messages (nodes).

timeStamp is usually read by a transmit end from the GPS and then added to the MAP message for transmission.

msgCnt is a number numbered by the transmit end for the MAP message sent by the transmit end, and a value of msgCnt ranges from 0 to 127. The number is randomly selected at the beginning of message sending, and then increases in ascending order. msgCnt may be used with the time stamp to prevent a replay attack.

nodes are a series of intersection messages in a local region of MAP message transmission, and include a series of nodes. Each node is an intersection node. The message of each node includes a name, an identifier (id), a node position (refPos (3D), where an x-axis represents a left-right space, a y-axis represents a front-rear space, and a z-axis represents a top-bottom space), and connection relationships (inLinks) with upstream and downstream intersection nodes.

Using a node 3 (nodeid 3) as an example, refPos (3D) represents a position of the node nodeid 3, and may be represented by using a longitude, a latitude, and an altitude. inLinks includes a series of combinations of upstream nodes that use nodeid 3 as a downstream node. For example, the upstream nodes of nodeid 3 are nodeid 1 and nodeid 2, and inLinks corresponding to nodeid 3 includes attributes of upstream nodes of nodeid 1 and upstream nodes of nodeid 2.

The upstream node nodeid 2 is used as an example. nodeid 3 is used as a downstream node of nodeid 2, and a corresponding inLink includes: a name, upstreamNodeId, a speed limit, a road width (linkWidth), a road section (lanes), a point of a road center line, and movements, where upstreamNodeId represents a region id of the upstream node and the upstream node id, linkWidth represents a road width between the upstream node id (nodeid 2) and the downstream node id (nodeId 3), and movements represent connection relationships between road sections defined by the upstream node id (nodeId 2) and the downstream node id (nodeId 3) and downstream road sections. lanes are a series of road sections (referred to as lanes below) defined by the upstream node id and the downstream node id. movements represent connection relationships between lanes defined by the upstream node id (nodeId 2) and the downstream node id (nodeId 3) and downstream lanes.

For a lane, maneuvers represent behaviors that can be performed on the lane. For example, the lane can allow any one of the following behaviors: turning left, going straight, turning right, going straight and turning right, and going straight and turning left. connectsTo represents a downstream lane connected to the lane. For example, the lane laneid 20 is used as an example. If turning left is performed on the lane laneid 20, a nodeId of a remote node connected to the lane laneid 20 is 4, and a connected lane is laneid 21. If going straight is performed on the lane, a nodeId of a remote node connected to the lane laneid 20 is 5, and a connected lane is laneid 22.

Seq. of connection represents a connection relationship of the lane laneid 20, and phaseId represents a state identifier of a signal light corresponding to laneid 20.

(2) SPAT Message

The SPAT message is used to transmit current state and time information of one or more signal lights at an intersection. The SPAT message may be used in a scenario in which an alarm is issued during red light running. A receiver of the SPAT message determines an algorithm based on the state of the signal light ahead, and needs to use the algorithm together with MAP data to determine to obtain traffic light information of which direction (turning left, turning right, or going straight), thereby providing real-time phase information of the signal light ahead for the vehicle.

Figure 4:
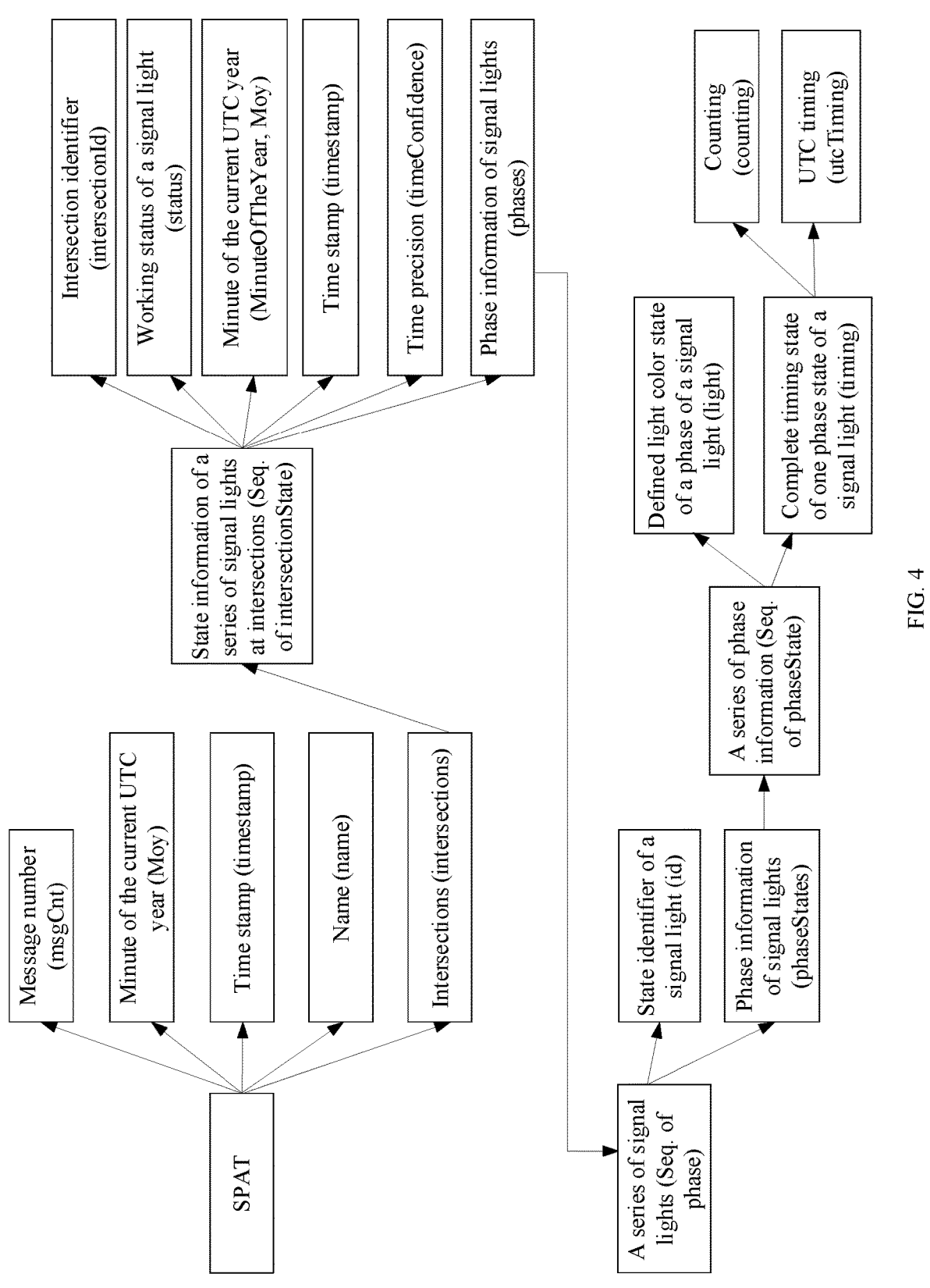
FIG. 4 is a schematic diagram of a SPAT in the conventional technology.

FIG. 4 is an example of a schematic diagram of a main structure of a SPAT message. As shown in FIG. 4, the main structure of the SPAT message is a structure form of layer-by-layer nesting. In FIG. 4, a solid-line box indicates a mandatory option, and a dashed-line box indicates an optional option.

The main structure of the SPAT message includes a message number (msgCnt), moy, a time stamp, a name, and intersections. Intersections include a series of intersection state information. For an intersection, the intersection includes phase information (phases) of signal lights, and phases include a series of signal lights. For a phase, the phase includes a state identifier (id) of the signal light and state information (phaseStates) of the signal light.

Currently, after obtaining the MAP message and the SPAT message from the road side device, the vehicle obtains id information of the lane, lane steering information Maneuvers, and longitude and latitude of the lane from the MAP message, to locate Phaseid in the MAP message, and then searches for Seq.of Phase from the SPAT message shown in FIG. 4, to find (phaseStates) corresponding to Phaseid, so as to obtain information about a signal light color and a remaining time.

However, in many scenarios, reliability of V2X communication cannot be ensured. Especially, when there is blocking between both communication parties or a vehicle speed is relatively high, the MAP message and the SPAT message received by a vehicle may not be an actual situation of a signal light at a current moment. In this case, the vehicle makes an incorrect judgment, and a safety accident easily occurs.

In this scenario, there may be another manner to assist the vehicle in recognizing a signal light state at an intersection. As shown in FIG. 2, a sensor disposed on the vehicle may be used to collect surrounding environment information of the vehicle. For example, an in-vehicle camera is used to collect image data of an intersection in front of the vehicle, and the sensor sends the collected image data to the MDC. The MDC recognizes a signal light state by using an image recognition capability. However, real scenarios are complex, and a signal light at a current intersection cannot be accurately recognized by using an image recognition function. For example, a shot image may include signal lights at a plurality of intersections or a vehicle light at a relatively high height, and a signal light at another intersection or a taillight may be easily recognized as the signal light at the current intersection. Consequently, false recognition is caused.

Currently, although the vehicle can obtain the V2I message, after receiving the V2I message, the vehicle can only choose to use or not to use information in the V2I message. Therefore, reliability of the V2I message cannot be ensured. The vehicle may also obtain visual information (that is, image data) collected by the in-vehicle camera, but the vehicle cannot accurately recognize, from the visual information, a signal light that the vehicle currently needs to pass through. Therefore, even if the vehicle obtains the V2I message and the visual information, the V2I message and the visual information cannot be fused. Simply speaking, the V2I message is equivalent to a "heard" message. For the vehicle, it is equivalent to listening to, with eyes closed, the traffic police to tell the vehicle whether the traffic light is currently a red light or a green light. However, the vehicle does not know a position of the traffic light mentioned by the traffic police in the image data. Therefore, the vehicle cannot recognize, from the image data, a signal light that the vehicle needs to currently pass through. Therefore, it is impossible to accurately verify whether the signal light that the vehicle needs to currently pass through is a red light or a green light. Therefore, accuracy of recognizing the signal state at the intersection by the vehicle still needs to be improved.

Figure 5:
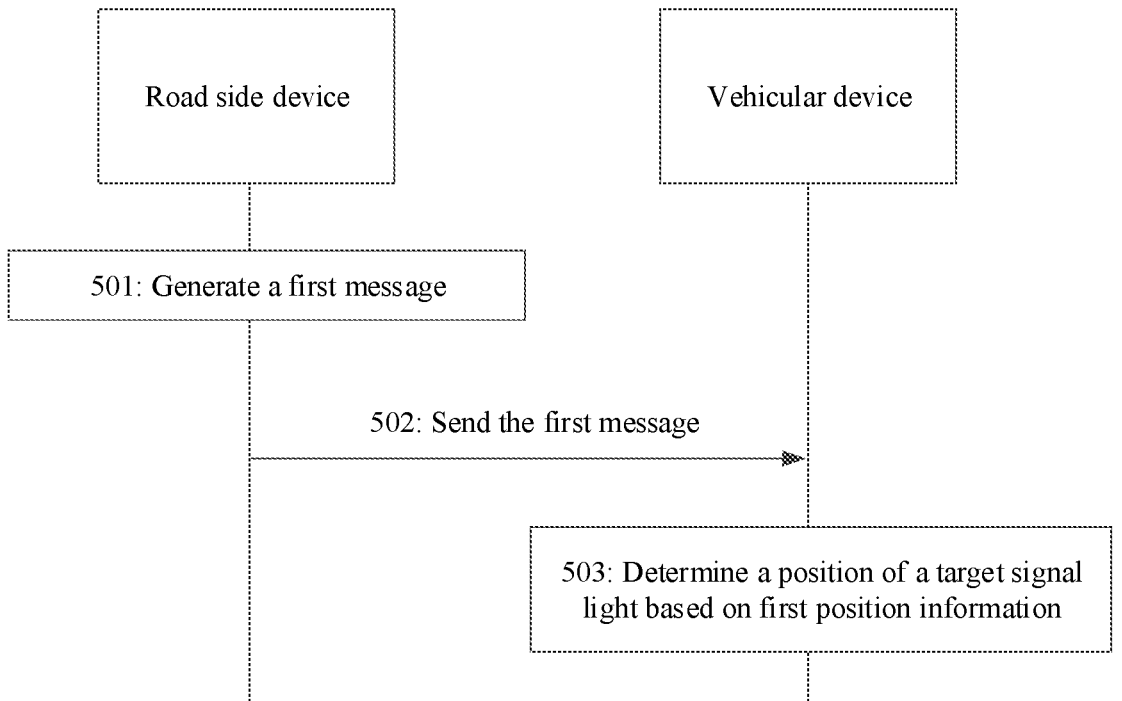
FIG. 5 is a schematic diagram of an information processing method according to an embodiment of this application.

Based on the foregoing content, FIG. 5 is an example of a schematic flowchart of an information processing method according to an embodiment of this application. The method may be performed by a vehicular device and a road side device of a vehicle. As shown in FIG. 5, the method includes the following steps.

Step 501: The road side device generates a first message, where the first message includes first position information of at least one first signal light, and the first message is a map MAP message or a signal phase and timing SPAT message.

The first position information is, for example, 3D position information of the signal light.

Step 502: The road side device sends the first message. Correspondingly, the vehicular device receives the first message from the road side device.

The first message in step 501 and step 502 may be implemented in a plurality of possible manners.

Implementation 1: The first message is the MAP message, that is, the MAP message includes the first position information of the at least one first signal light. For example, the first position information is located in a Seq. of Connection field of the MAP message.

Implementation 2: The first message is the SPAT message, that is, the SPAT message includes the first position information of the at least one first signal light. For example, the first position information is located in a Seq. of Phase field of the SPAT message.

Implementation 3: The first message is the SPAT message, that is, the SPAT message includes the first position information of the at least one first signal light. The SPAT message further includes identification information of the at least one first signal light. The road side device may further send the MAP message to the vehicular device. The MAP message includes the identification information. For example, a Seq. of IntersectionState field of the SPAT message includes the first position information and the identification information, and the Seq. of connection field of the MAP message includes the identification information.

Step 503: The vehicular device determines a position of a target signal light based on the first position information.

In this embodiment of this application, the vehicular device may obtain the first position information of the at least one first signal light from the first message received by the road side device, and may determine the position of the target signal light based on the first position information, so as to assist the vehicular device in accurately recognizing the target signal light in collected image data, so that a V2I message and visual information can be matched and fused, thereby improving accuracy of recognizing a state of a signal light at an intersection by a vehicle, and avoiding passive blind listening.

In this embodiment of this application, the road side device may send the MAP message and the SPAT message to the vehicular device. The MAP message may further include a lane information set, and the SPAT message may include state information of a signal light corresponding to each piece of lane information included in the lane information set.

Implementation 1 is used as an example. The first message sent by the road side device to the vehicular device is the MAP message, that is, the MAP message includes the first position information of the at least one first signal light and the lane information set. The road side device further sends the SPAT message to the vehicular device, and the SPAT message may include the state information of the signal light corresponding to each piece of lane information included in the lane information set.

Implementation 2 is used as an example. The first message sent by the road side device to the vehicular device is the SPAT message, that is, the SPAT message includes the first position information of the at least one first signal light and the state information of the signal light corresponding to each piece of lane information included in the lane information set. The road side device further sends the MAP message to the vehicular device. The MAP message includes the lane information set.

Implementation 3 is used as an example. The first message sent by the road side device to the vehicular device is the SPAT message, that is, the SPAT message includes the first position information of the at least one first signal light, the identification information of the at least one first signal light, and the state information of the signal light corresponding to each piece of lane information included in the lane information set. The road side device further sends the MAP message to the vehicular device. The MAP message includes the lane information set and the identification information of the at least one first signal light.

The lane information set includes lane information of at least one lane, and the lane information may include a lane identifier, longitude and latitude information of a lane, and lane steering information. The longitude and latitude information of the lane may be, for example, longitude and latitude of a stop line at a lane end. Each lane may correspond to one or more pieces of lane information. For one lane, the lane identifier and the longitude and latitude information of the lane are determined. When the lane corresponds to one piece of steering information, the lane corresponds to one piece of lane information. For example, an identifier of a lane A is laneid 2, and the lane only allows going straight. In this case, the lane corresponds to one piece of lane information, that is, laneid 2, longitude and latitude information, and going straight. When the lane corresponds to a plurality of pieces of steering information, the lane corresponds to a plurality of pieces of lane information. For example, an identifier of a lane B is a laneid 3, and the lane may allow going straight and turning left. In this case, the lane corresponds to two pieces of lane information. One piece of lane information is laneid 2, longitude and latitude information, and going straight, and the other piece of lane information is laneid 2, longitude and latitude information, and turning left.

Each piece of lane information in the lane information set corresponds to state information of a signal light. The state information of the signal light includes, for example, a light color and a remaining time of the signal light.

State information that is of the signal light and that corresponds to different lane information may be the same. For example, the lane B corresponds to lane information 1 and lane information 2. The lane information 1 includes laneid 2, longitude and latitude information 1, and going straight. The state information that is of the signal light and that corresponds to the lane information 1 includes that a color of the signal light is green, and a remaining time is 15 s. The lane information 2 includes laneid 2, the longitude and latitude information 1, and turning left. The state information that is of the signal light and that corresponds to the lane information 2 includes that a color of the signal light is green, and a remaining time is 15 s.

State information that is of the signal light and that corresponds to different lane information may alternatively be different. For example, a lane C corresponds to lane information 3, including laneid 3, longitude and latitude information 2, and turning left. The state information that is of the signal light and that corresponds to the lane information 3 includes that a color of the signal light is green, and a remaining time is 15 s. The lane C corresponds to lane information 4, and the lane information 4 includes laneid 4, longitude and latitude information 3, and going straight. The state information that is of the signal light and that corresponds to the lane information 4 includes that a color of the signal light is red, and a remaining time is 18 s.

In a possible implementation, step 503 in which the vehicular device determines the position of the target signal light based on the first position information may be implemented by using the following steps S1 and S2. In addition, the vehicular device may further determine first state information of the target signal light based on the MAP message and the SPAT message. This may be implemented by using the following step S3.

S1: The vehicular device determines, based on position information of the vehicle, a driving direction of the vehicle, and the lane information set, target lane information corresponding to a target lane in which the vehicle is located.

The position information of the vehicle and the driving direction of the vehicle may be determined in a plurality of manners. The following uses a manner a1 and a manner a2 as examples for description.

Manner a1: The position information of the vehicle may be a positioning position determined based on GNSS positioning, and may be point coordinate values of the vehicle in a GNSS coordinate system, that is, geographical coordinates of the vehicle. The driving direction of the vehicle may be determined based on a historical positioning position and a current positioning position of the vehicle.

Manner a2: The position information of the vehicle may alternatively be a positioning position determined based on a high-precision map. For example, the positioning position of the vehicle may be a positioning position that is of the vehicle on the high-precision map and that is determined by a high-precision map module based on position information received by a positioning module and surrounding environment information of the vehicle that is obtained by a sensor system, for example, a coordinate position of the vehicle on the high-precision map. For the driving direction of the vehicle, lane information corresponding to a current positioning position of the vehicle may alternatively be determined based on the high-precision map, and a head direction of the vehicle may be estimated. For example, if it is determined, based on the lane information of the positioning position of the vehicle, that the lane in which the vehicle is located is a lane from south to north, it may be inferred that the head direction of the vehicle is from south to north.

In a possible implementation, an example in which the lane information set includes a plurality of pieces of lane information is used. Each piece of lane information includes a lane identifier, longitude and latitude information, and steering information. The vehicular device may determine, based on the position information of the vehicle, the driving direction of the vehicle, and the lane information set, a lane that is consistent with the driving direction of the vehicle and that is closest to the vehicle, to determine an identifier of the lane in which the vehicle is located (that is, the target lane). Then, the vehicular device may determine, based on navigation information or a driving route of the vehicle, a driving direction of the vehicle after the vehicle arrives at an intersection at which the target signal light is located, for example, the vehicle needs to go straight, or needs to turn right, or needs to turn left, so as to uniquely determine one piece of target lane information from the lane information set.

Figure 6:
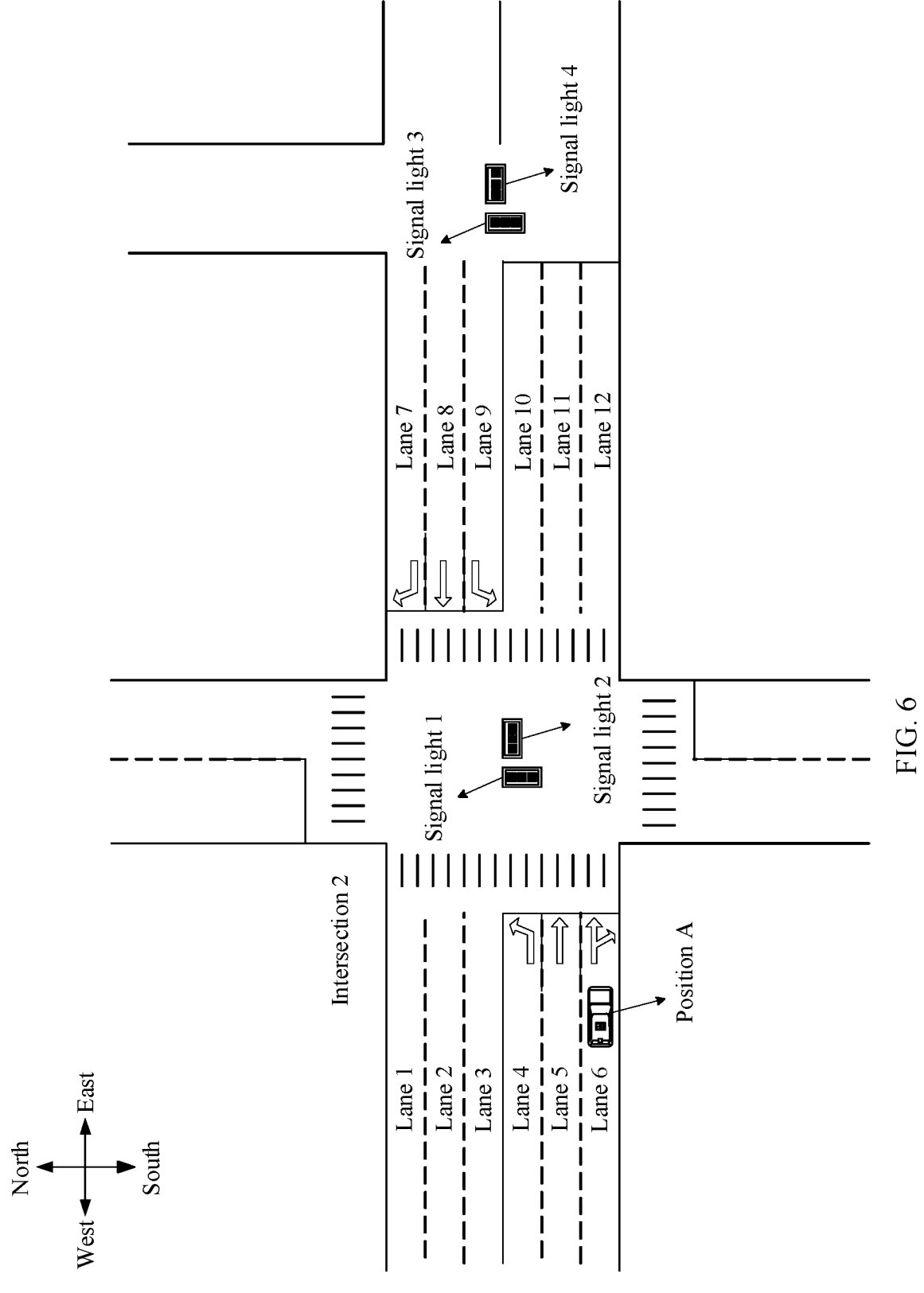
FIG. 6 is a schematic diagram of an application scenario according to an embodiment of this application.

FIG. 6 is a schematic diagram of an application scenario according to an embodiment of this application. As shown in FIG. 6, the driving direction of the vehicle is from west to east, a current position of the vehicle is a position A, and the lane information set includes at least lane information of each lane, for example, lane information of a lane 1 to a lane 12 shown in FIG. 6. The vehicular device determines, based on latitude and longitude information of a lane included in each piece of lane information in the lane information set, the current position A of the vehicle, and the driving direction of the vehicle from west to east, a lane that is closest to the position A and whose lane direction is consistent with the driving direction of the vehicle, that is, the lane 6. The vehicular device may determine, from the lane information set, two pieces of lane information corresponding to the lane 6. One piece of lane information is laneid 6, longitude and latitude information of the lane 6, and going straight, and the other piece of lane information is laneid 6, the longitude and latitude information of the lane 6, and turning right. The vehicular device may further determine, based on the navigation information, that the vehicle needs to go straight after passing through an intersection 2. In this case, the vehicular device may determine the target lane information, that is, laneid 6, the longitude and latitude information of the lane 6, and going straight from the two pieces of lane information corresponding to the lane 6.

S2: The vehicular device determines, based on the target lane information and the first position information that is of the signal light and that corresponds to each piece of lane information included in the lane information set, the position that is of the target signal light and that corresponds to the target lane information, where the target signal light is a signal light that the vehicle is to first pass through in the future when traveling on the target lane.

S3: The vehicular device determines the first state information of the target signal light based on the target lane information and the state information that is of the signal light and that corresponds to each piece of lane information included in the lane information set.

For example, the lane information set includes five pieces of lane information. To be specific, road information includes five pieces of lane information and the first position information and the state information that are of five signal lights and that respectively correspond to the five pieces of lane information. The vehicular device may determine, based on the target lane information and the first position information and the state information that are of five signal lights and that respectively correspond to the five pieces of lane information, the first position information and the state information that are of the signal light and that correspond to the target lane information, that is, the first position information and the first state information of the target signal light, including the first position information of the target signal light and the first state information of the target signal light. The first state information includes a light color and a remaining time that are of the target signal light and that are obtained from a road side unit. For example, as shown in FIG. 6, the vehicle travels on the lane 6, and the target signal light is a signal light 1 at an end of the lane 6. The vehicular device first obtains a light color and a remaining time of the signal light 1. For example, the light color is red, and the remaining time is 15 s.

Based on the foregoing embodiment, in a possible implementation, the vehicular device may further determine actual state information of the target signal light based on the first position information of the target signal light in a visual perception manner. This may be specifically implemented by using the following S4 to S6.

S4: The vehicular device collects image data of a target intersection at which the target signal light is located. The target intersection is also an intersection that the vehicle is to first pass through in the future when traveling on the target lane.

As shown in FIG. 6, the vehicle collects front image data at the position A. The image data includes the signal light 1 of the intersection 2, and may further include a signal light 3 of a next intersection 3. Therefore, the vehicular device needs to recognize which signal light in the image data is the target signal light. When a sensor of the vehicle collects image data, a position of the target signal light in the image data is affected by factors such as a relative position between the vehicle and the target signal light and a posture of the vehicle. Therefore, the vehicular device may recognize the target signal light in the image data based on these factors.

S5: The vehicular device recognizes second state information of the target signal light from the image data based on the first position information of the target signal light, the position information of the vehicle, and posture information of the vehicle.

Figure 7:
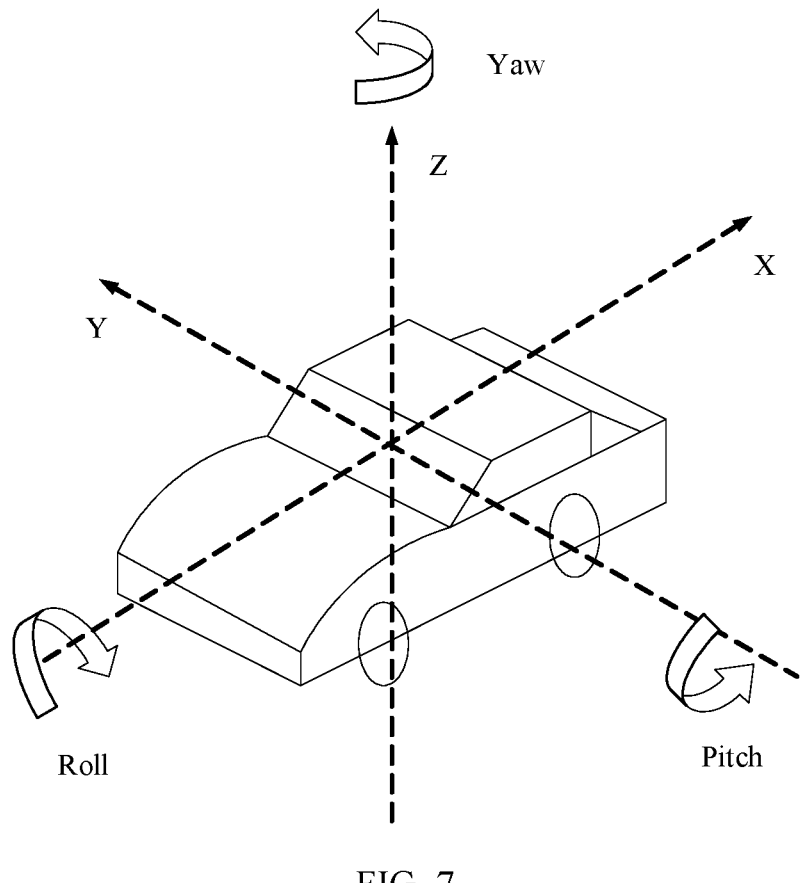
FIG. 7 is a schematic diagram of a vehicle coordinate system according to an embodiment of this application.

The posture information of the vehicle may be detected by using a sensor disposed on the vehicle, for example, by using a sensor such as a three-axis gyroscope, a three-axis accelerometer, or a three-axis magnetometer. The posture information of the vehicle includes a pitch angle (Pitch), a roll angle (Roll), and a yaw angle (Yaw). The yaw angle is also referred to as a yawing angle. As shown in FIG. 7, a coordinate system OXYZ uses a centroid of the vehicle as a coordinate origin O, the X-axis is along a vertical axis direction of the vehicle, the Y-axis is perpendicular to the vertical axis direction of the vehicle, the Z-axis is perpendicular to the XOY plane, the roll angle is an angle of rotation around the X-axis in the coordinate system, the pitch angle is an angle of rotation around the Y-axis in the coordinate system, and the yaw angle is an angle of rotation around the Z-axis in the coordinate system.

The vehicular device recognizes, from the image data based on the first position information of the target signal light, the position information of the vehicle, and the posture information of the vehicle by using an image recognition capability, a pixel region in which the target signal light is located, and then recognizes the second state information of the target signal light from the pixel region in which the target signal light is located. The second state information includes a light color and a remaining time that are of the target signal light and that are recognized from the image data.

S6: The vehicular device determines actual state information of the target signal light based on the first state information and the second state information.

In S6, the vehicular device may determine the actual state information of the target signal light based on the light color and the remaining time that are of the target signal light and that are obtained from the road side device and the light color and the remaining time that are of the target signal light and that are recognized from the image data.

In this embodiment of this application, the vehicular device may obtain the first position information of the signal light from the road information received by the road side device, so as to assist the vehicular device in recognizing the signal light in the image data collected by the vehicular device, so that a V2X message and visual information can be fused and matched, and real-time information of the target signal light can be accurately determined, thereby improving accuracy of recognizing a state of a signal light at an intersection by a vehicle, and avoiding passive blind listening.

In this embodiment of this application, there are a plurality of possible implementations in which the vehicular device may receive the message from the road side device. The following describes a manner b1, a manner b2, and a manner b3.

Manner b1: The road side device sends the map MAP message to the vehicular device, and sends the SPAT message to the vehicular device, where the MAP message includes a first correspondence between the lane information included in the lane information set and a state identifier of the signal light, and the SPAT message includes a second correspondence among the state identifier of the signal light, the first position information of the signal light, and the state information of the signal light.

Figure 8:
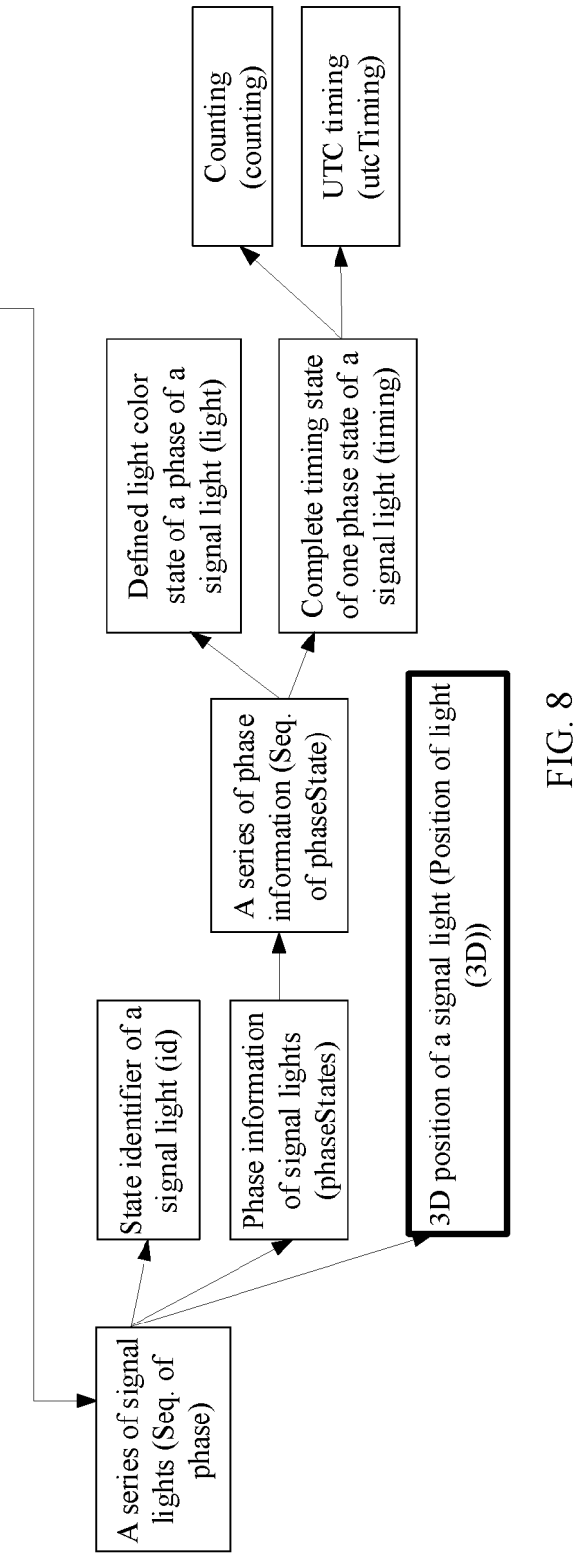
FIG. 8 is a schematic diagram of a SPAT message according to an embodiment of this application.

In Manner b1, the SPAT message in the conventional technology (as shown in FIG. 4) is modified, and the first position information of the signal light is added to the SPAT message, so that the vehicular device obtains the first position information of the target signal light from the SPAT message. FIG. 8 shows only an example of some modified content of the SPAT message. As shown in FIG. 8, Position of light (3D) is added to Seq.of Phase, to recognize 3D positions (front and rear positions, left and right positions, and top and bottom positions) of the signal light by the vehicular device.

Correspondingly, the vehicular device receives the MAP message and the SPAT message from the road side device.

Further, in S2 and S3, that the vehicular device determines, based on the target lane information and the first position information and the state information that are of the signal light and that correspond to each piece of lane information included in the lane information set, the first position information and the first state information that are of the target signal light and that correspond to the target lane information may be implemented in the following implementation: determining, based on the target lane information and the first correspondence, a state identifier that is of the target signal light and that corresponds to the target lane information, and determining, based on the state identifier of the target signal light and the second correspondence, the first position information and the state information that are of the signal light and that correspond to the state identifier of the target signal light, that is, the first position information and the first state information of the target signal light. In this way, the first position information of the signal light is added to the SPAT message, so as to assist the vehicular device in recognizing the signal light in the image data, so that a V2X message and visual information can be fused and matched, and real-time information of the current signal light can be accurately determined, thereby improving accuracy of recognizing a state of a signal light at an intersection by a vehicle, and avoiding passive blind listening.

Manner b2: The road side device sends the map MAP message to the vehicular device, and sends the SPAT message to the vehicular device, where the MAP message includes a third correspondence among the lane information included in the lane information set, the state identifier of the signal light, and the first position information of the signal light, and the SPAT message includes a fourth correspondence between the state identifier of the signal light and the state information of the signal light.

Figure 9:
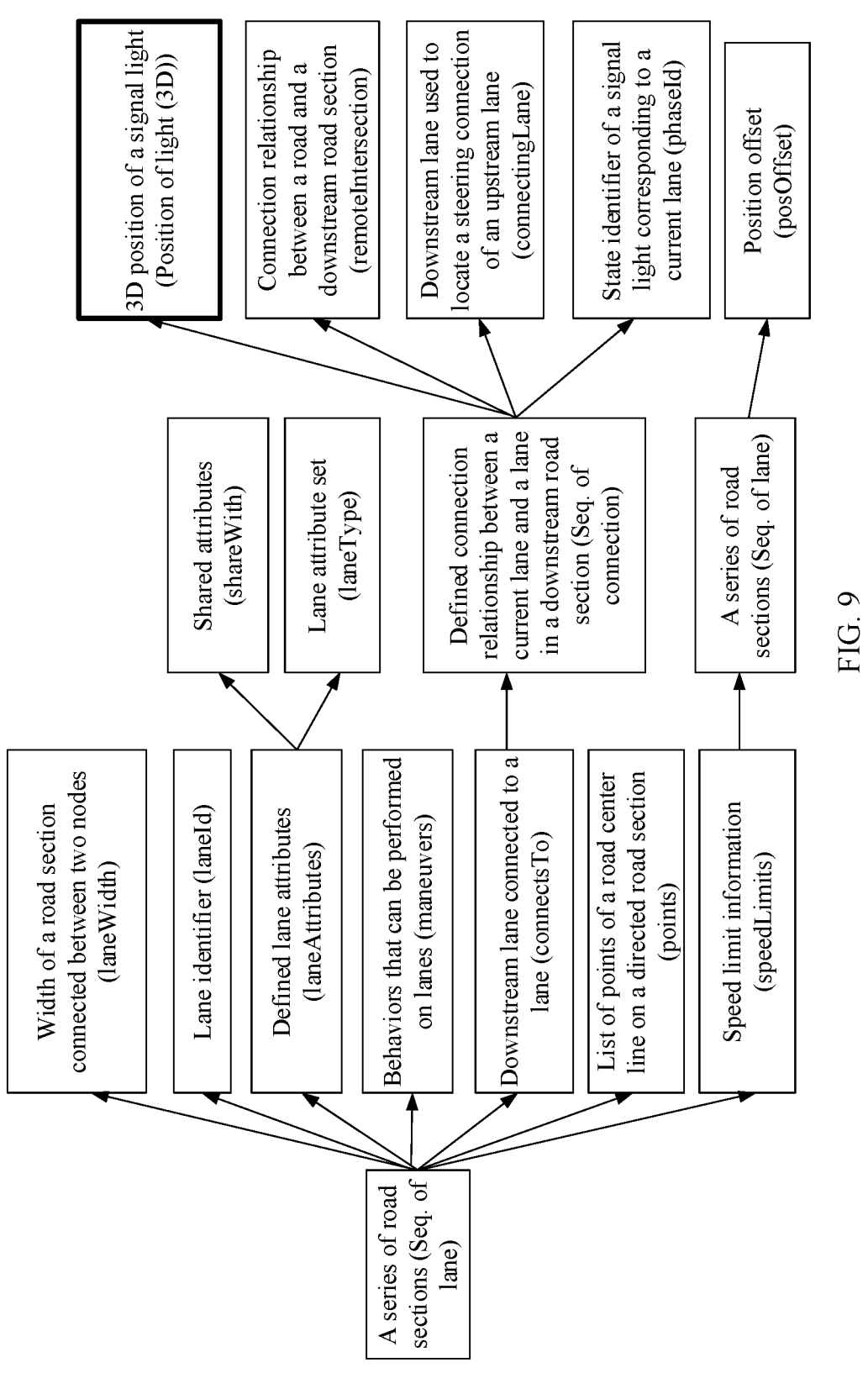
FIG. 9 is a schematic diagram of a MAP message according to an embodiment of this application.

In Manner b2, the MAP message in the conventional technology (as shown in FIG. 3A and FIG. 3B) is modified, and the first position information of the signal light is added to the MAP message, so that the vehicular device obtains the first position information of the target signal light from the MAP message. FIG. 9 shows only an example of some modified content of the MAP message. As shown in FIG. 9, Position of light (3D) is added to Seq.of Connection, to recognize 3D positions (front and rear positions, left and right positions, and top and bottom positions) of the signal light by the vehicular device.

Correspondingly, the vehicular device receives the map MAP message from the road side device, and receives the signal phase and timing SPAT message from the road side device.

Further, in the foregoing steps S2 and S3, that the vehicular device determines, based on the target lane information and the first position information and the state information that are of the signal light and that correspond to each piece of lane information included in the lane information set, the first position information and the first state information that are of the target signal light and that correspond to the target lane information may be implemented in the following implementation: determining, based on the target lane information and the third correspondence, a state identifier and the first position information that are of the target signal light and that correspond to the target lane information; and determining, based on the state identifier of the target signal light and the fourth correspondence, the state information that is of the signal light and that corresponds to the state identifier of the target signal light, that is, the first state information. In this way, the first position information of the signal light is added to the MAP message, so as to assist the vehicular device in recognizing the signal light in the image data, so that a V2X message and visual information can be fused and matched, and real-time information of the target signal light can be accurately determined, thereby improving accuracy of recognizing a state of a signal light at an intersection by a vehicle, and avoiding passive blind listening.

Manner b3: The road side device sends the map MAP message to the vehicular device, and sends the SPAT message to the vehicular device, where the MAP message includes a fifth correspondence among the lane information included in the lane information set, a state identifier of the signal light, and an identifier of the signal light, and the SPAT message includes a sixth correspondence between the state identifier of the signal light and the first position information of the signal light, and a seventh correspondence between the identifier of the signal light and the state information of the signal light.

Figure 10A:
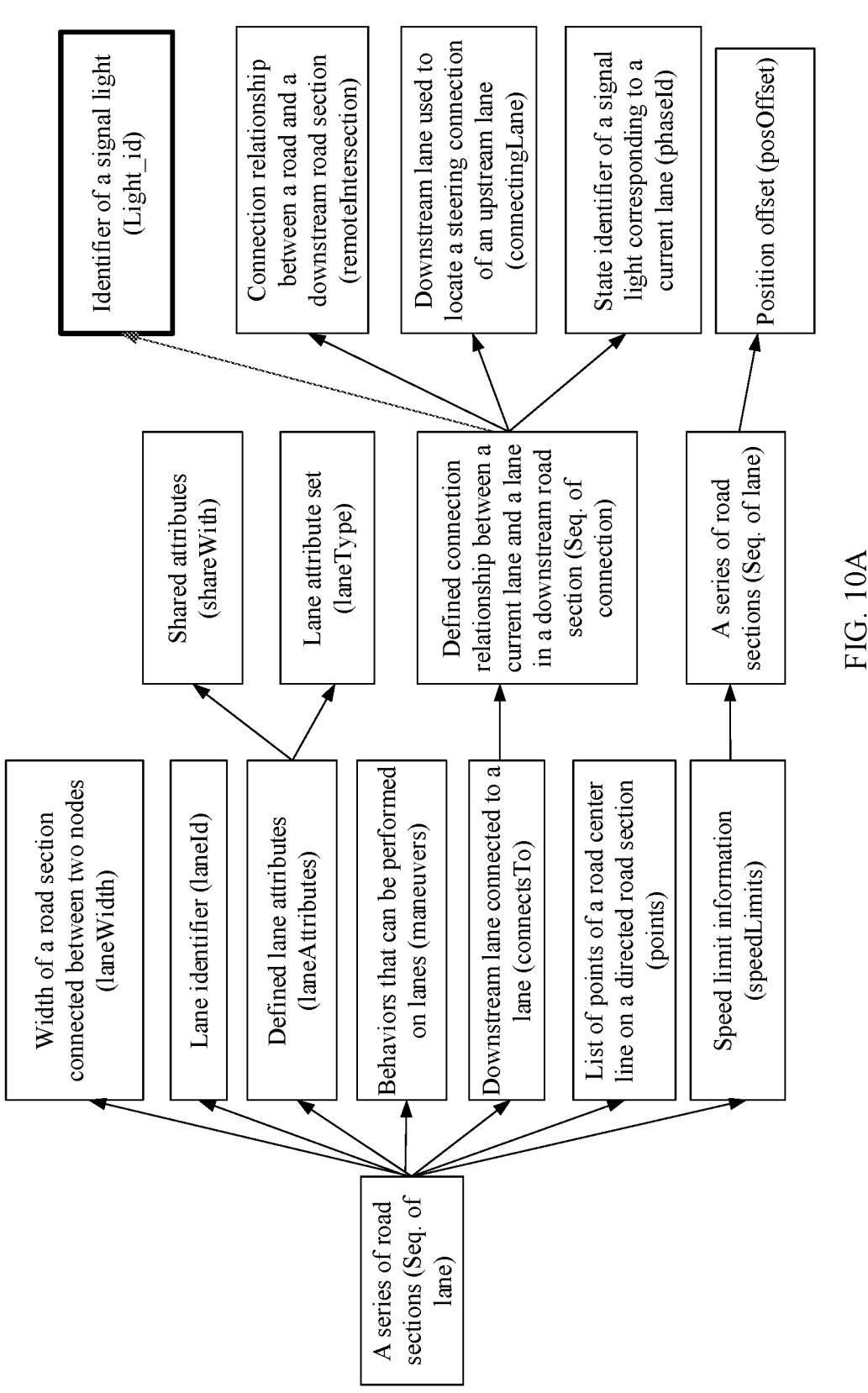
FIG. 10A is a schematic diagram of a MAP message according to an embodiment of this application.
Figure 10B:
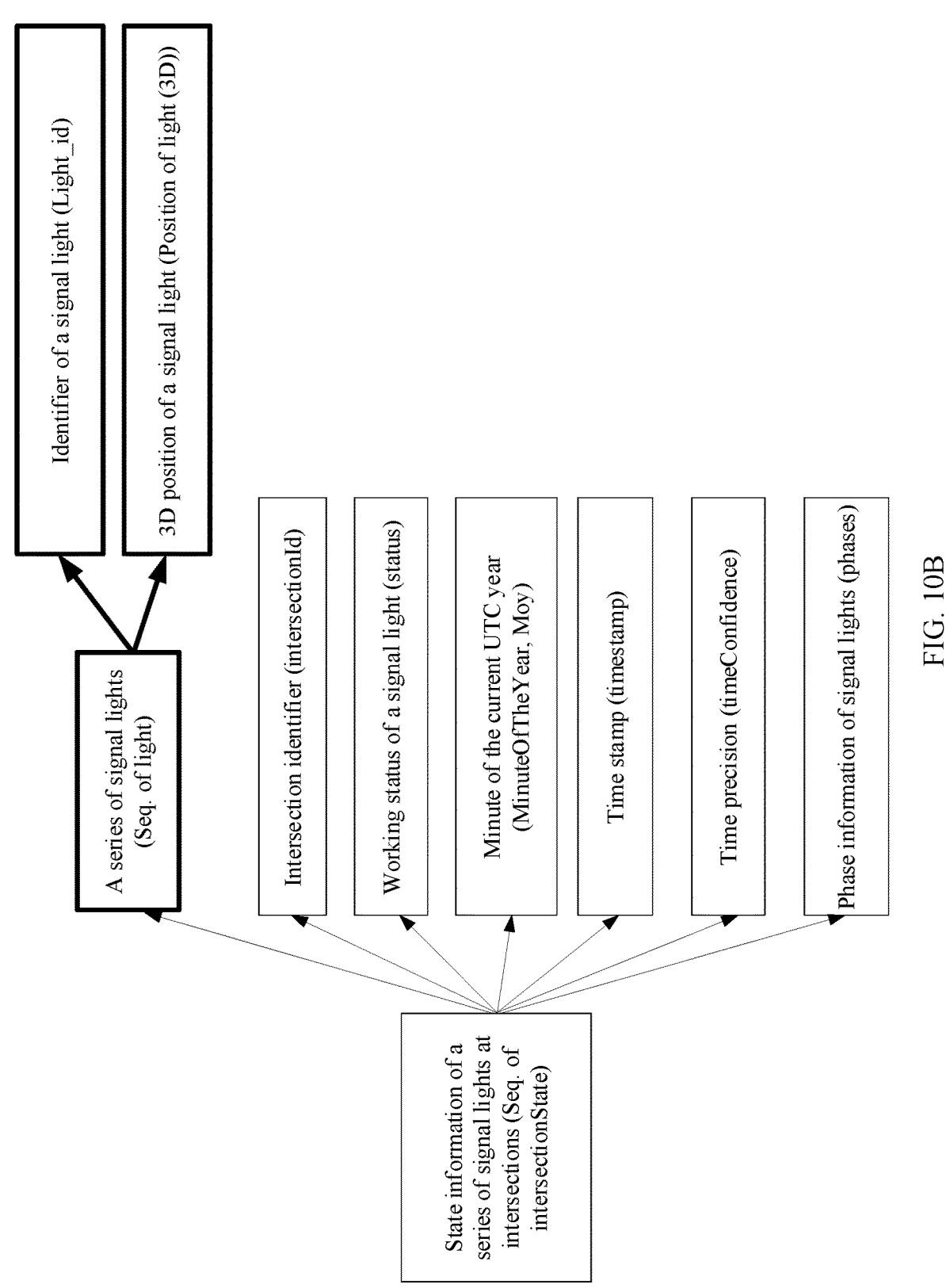
FIG. 10B is a schematic diagram of a SPAT message according to an embodiment of this application.

In Manner b3, both the MAP message in the conventional technology (as shown in FIG. 3A and FIG. 3B) and the SPAT message in the conventional technology (as shown in FIG. 4) are modified, the identifier of the signal light is added to the MAP message, and the identifier of the signal light and the first position information of the signal light are added to the SPAT message, so that the vehicular device obtains the first position information of the target signal light from the SPAT message based on the identifier of the signal light in the MAP message. FIG. 10A shows only an example of some modified content of the MAP message, and FIG. 10B shows only an example of some modified content of the SPAT message. As shown in FIG. 10A, Light_id is added to Seq. of Connection of the MAP message, and as shown in FIG. 10B, Light_id and Position of light (3D) are added to Seq. of light of the SPAT message, where Position of light (3D) is used to recognize 3D positions of the signal light (front and rear positions, left and right positions, and top and bottom positions), Light_id is used to connect the MAP message and the SPAT message, and the first position information of the signal light in the SPAT message may be viewed based on the connection of Light_id.

Correspondingly, the vehicular device receives the map MAP message from the road side device, and receives the signal phase and timing SPAT message from the road side device.

Further, in the foregoing S2 and S3, that the vehicular device determines, based on the target lane information and the first position information and the state information that are of the signal light and that correspond to each piece of lane information included in the lane information set, the first position information and the first state information that are of the target signal light and that correspond to the target lane information may be implemented in the following implementation: determining the state identifier of the target signal light and the identifier of the target signal light based on the target lane information and the fifth correspondence; determining the first position information of the target signal light based on the state identifier of the target signal light and the sixth correspondence; and determining the first state information based on the identifier of the target signal light and the seventh correspondence. In this way, Light_id is added to the MAP and SPAT messages to connect the MAP and SPAT messages, and Position of light (3D) is added to the SPAT to obtain the first position information of the signal light, so as to assist the vehicular device in recognizing the signal light in the image data, so that a V2X message and visual information can be fused and matched, and real-time information of the current signal light can be accurately determined, thereby improving accuracy of recognizing a state of a signal light at an intersection by a vehicle, and avoiding passive blind listening.

Based on any one of the foregoing embodiments, signal light type information may also be added to the first message. For example, type of light is added to the first message as an optional field. For example, the first message is the MAP message, and the signal light type information is located in the Seq. of Connection field of the MAP message. For another example, the first message is the SPAT message, and the signal light type information is located in the Seq. of Phase field of the SPAT message. For another example, the first message is the SPAT message, and the signal light type information is located in the Seq. of IntersectionState field of the SPAT message.

The vehicular device may determine the type information of the target signal light from the first message. Further, when determining actual state information of the target signal, the vehicular device may more accurately recognize the target signal light from the image data with reference to the signal light type information and the signal light position information in the first message.

Figure 11A:
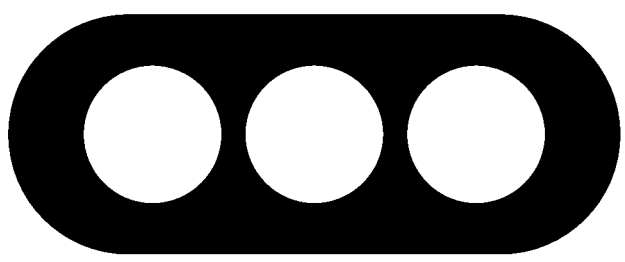
FIG. 11A to FIG. 11G are schematic diagrams of signal light types according to an embodiment of this application.
Figure 11B:
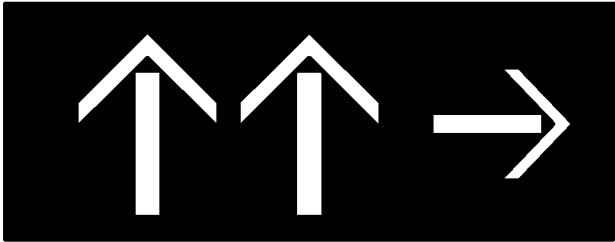
Figure 11C:
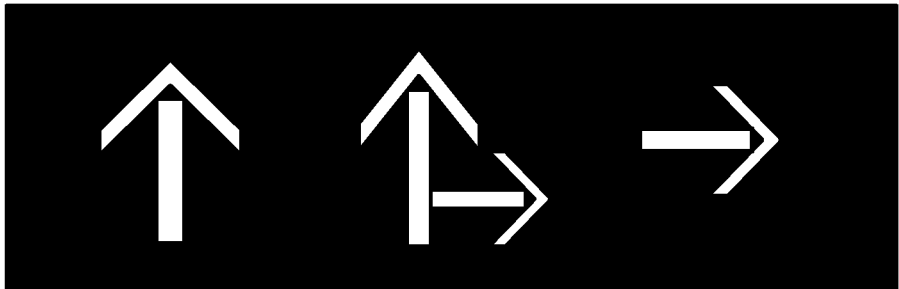
Figure 11D:
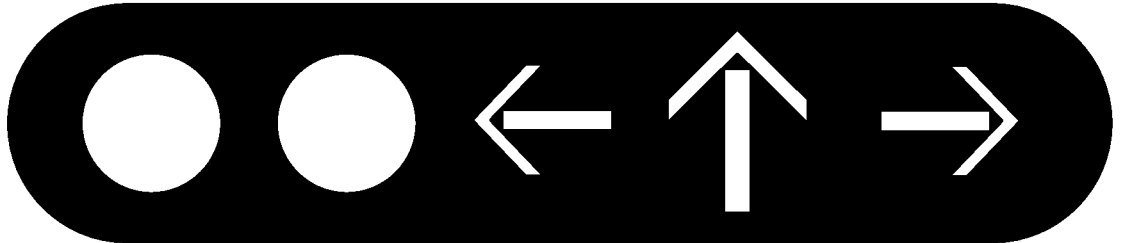
Figure 11E:
Figure 11F:
Figure 11G:
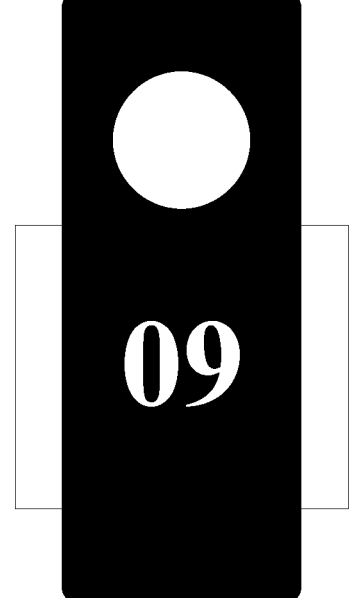

The signal light type information may indicate a type of the signal light. The type of the signal light is, for example, a conventional signal light shown in FIG. 11A, a direction indication signal light shown in FIG. 11B, a hybrid direction indication light shown in FIG. 11C, a circle-arrow hybrid light shown in FIG. 11D, a lane signal light shown in FIG. 11E, a rectangular signal light shown in FIG. 11F, or a countdown light shown in FIG. 11G.

Based on any one of the foregoing embodiments, in a possible implementation, the vehicular device may further obtain second position information from a sensing device, where the second position information indicates a position of at least one second signal light. S503 in which the position of the target signal light is determined based on the first position information may be implemented in the following manner: determining the position of the target signal light based on the first position information and the second position information. In this way, the position of the target signal light is determined with reference to the first position information in the first message and the second position information that is obtained by the sensing device, so that accuracy of determining the position of the target signal light can be improved.

In S6, the vehicular device may determine the actual state information of the target signal light based on the first state information and the second state information in a plurality of implementations, which are separately described below.

In a possible implementation, if the first state information matches the second state information, the first state information is determined as the actual state information of the target signal light.

In another possible implementation, if the first state information does not match the second state information, prompt information is generated, where the prompt information is used to prompt a driver to recognize the target signal light.

In still another possible implementation, if the first state information does not match the second state information, the first state information or the second state information is used as the actual state information of the target signal.

In S6, after determining the actual state information of the target signal light based on the first state information and the second state information, the vehicular device may further control a motion state of the vehicle at the target intersection based on the actual state information of the target signal light and traffic signal light rules. For example, if an actual state of the target signal light is green and a remaining time is greater than 3 s, the vehicle is controlled to pass through the target intersection, or when the actual state of the target signal light is red, the vehicle is controlled to be in a stop state.

The terms "system" and "network" may be used interchangeably in embodiments of this application. "At least one" means one or more, and "a plurality of" means two or more. In addition, "and/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. At least one of the following items (pieces) or a similar expression thereof refers to any combination of these items, including any combination of singular items (pieces) or plural items (pieces). For example, at least one of a, b, or c may indicate: a, b, c, a-b, a-c, b-c, or a-b-c, where a, b, and c may be singular or plural.

In addition, unless otherwise specified, ordinal numbers such as "first" and "second" mentioned in embodiments of this application are used to distinguish between a plurality of objects, but are not used to limit a sequence, a time sequence, priorities, or importance of the plurality of objects. For example, a first vehicle and a second vehicle are merely intended to distinguish between different vehicles, and do not indicate that the two vehicles have different priorities, importance, or the like.

It should be noted that, names of the foregoing messages are merely examples. With evolution of communication technologies, the name of any foregoing message may change. However, regardless of how the names of the messages change, provided that meanings of the messages are the same as those of the messages in this application, the messages fall within the protection scope of this application.

The foregoing mainly describes the solutions provided in this application from a perspective of interaction between the network elements. It may be understood that, to implement the foregoing functions, each network element includes a corresponding hardware structure and/or software module for executing each function. A person skilled in the art should be easily aware that, units, algorithms, and steps in the examples described with reference to embodiments disclosed in this specification can be implemented in a form of hardware or a combination of hardware and computer software in the present application. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of the present application.

Figure 12:
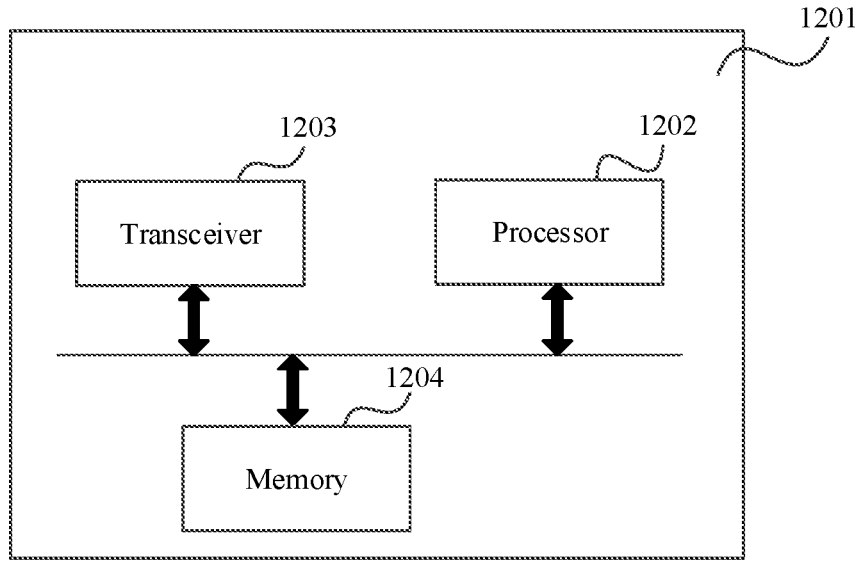
FIG. 12 is a schematic diagram of a communication apparatus according to an embodiment of this application.

According to the foregoing method, FIG. 12 is a schematic diagram of a structure of an information processing apparatus according to an embodiment of this application. As shown in FIG. 12, the information processing apparatus may be a road side device or a vehicular device. Alternatively, the information processing apparatus may be a chip or a circuit, for example, a chip or a circuit that may be disposed in the road side device, or a chip or a circuit that may be disposed in the vehicular device.

Further, the information processing apparatus 1201 may further include a bus system. A processor 1202, a memory 1204, and a transceiver 1203 may be connected by using the bus system.

It should be understood that the processor 1202 may be a chip. For example, the processor 1202 may be a field programmable gate array (FPGA), an application specific integrated circuit (ASIC), a system on chip (SoC), a central processing unit (CPU), a network processor (NP), a digital signal processing circuit (DSP), a micro controller (MCU), a programmable controller (PLD), or another integrated chip.

In an implementation process, the steps in the foregoing method may be completed by using an integrated logic circuit of hardware in the processor 1202 or an instruction in a form of software. The steps of the method disclosed with reference to embodiments of this application may be directly performed by a hardware processor, or may be performed by a combination of hardware and software modules in the processor 1202. A software module may be located in a mature storage medium in the art, such as a random access memory, a flash memory, a read-only memory, a programmable read-only memory, an electrically erasable programmable memory, or a register. The storage medium is located in the memory 1204, and the processor 1202 reads information in the memory 1204 and completes the steps in the foregoing method in combination with hardware of the processor 1202.

It should be noted that the processor 1202 in this embodiment of this application may be an integrated circuit chip and has a signal processing capability. In an implementation process, steps in the foregoing method embodiment may be implemented by using a hardware integrated logic circuit in the processor, or an instruction in a form of software. The processor may be a general-purpose processor, a digital signal processor (DSP), an application specific integrated circuit (ASIC), a field programmable gate array (FPGA) or another programmable logic device, a discrete gate or a transistor logic device, or a discrete hardware component. The methods, steps, and logic block diagrams disclosed in embodiments of this application may be implemented or executed. The general-purpose processor may be a microprocessor, or the processor may be any conventional processor or the like. Steps of the method disclosed with reference to embodiments of this application may be directly performed by a hardware decoding processor, or may be performed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor.

It may be understood that the memory 1204 in this embodiment of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memory of the system and method described in this specification is intended to include but is not limited to these and a memory of any another proper type.

When the information processing apparatus 1201 corresponds to the vehicular device in the foregoing method, the information processing apparatus 1201 may include the processor 1202, the transceiver 1203, and the memory 1204. The memory 1204 is configured to store instructions, and the processor 1202 is configured to execute the instructions stored in the memory 1204, to implement the related solutions of the vehicular device in one or more corresponding methods shown in FIG. 5.

When the information processing apparatus 1201 corresponds to the road side device in the foregoing method, the information processing apparatus 1201 may include the processor 1202, the transceiver 1203, and the memory 1204. The memory 1204 is configured to store instructions, and the processor 1202 is configured to execute the instructions stored in the memory 1204, to implement the related solutions of the road side device in one or more corresponding methods shown in FIG. 5.

For concepts, explanations, detailed descriptions, and other steps that are involved in the information processing apparatus and that are related to the technical solutions provided in embodiments of this application, refer to the descriptions of the content in the foregoing method or other embodiments. Details are not described herein again.

Figure 13:
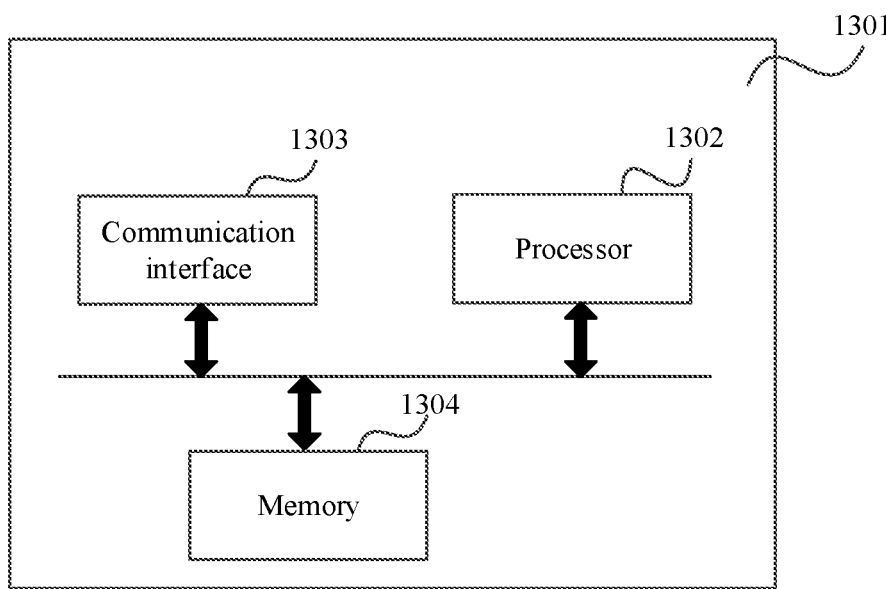
FIG. 13 is a schematic diagram of a communication apparatus according to an embodiment of this application.

According to the foregoing method, FIG. 13 is a schematic diagram of a structure of an information processing apparatus according to an embodiment of this application. As shown in FIG. 13, the information processing apparatus 1301 may include a communication interface 1303, a processor 1302, and a memory 1304. The communication interface 1303 is configured to input and/or output information. The processor 1302 is configured to execute a computer program or an instruction, so that the information processing apparatus 1301 implements the method of the vehicular device in the related solution in FIG. 5, or the information processing apparatus 1301 implements the method of the road side device in the related solution in FIG. 5. In this embodiment of this application, the communication interface 1303 may implement the solution implemented by the transceiver 1203 in FIG. 12, the processor 1302 may implement the solution implemented by the processor 1202 in FIG. 12, and the memory 1304 may implement the solution implemented by the memory 1204 in FIG. 12. Details are not described herein again.

Figure 14:
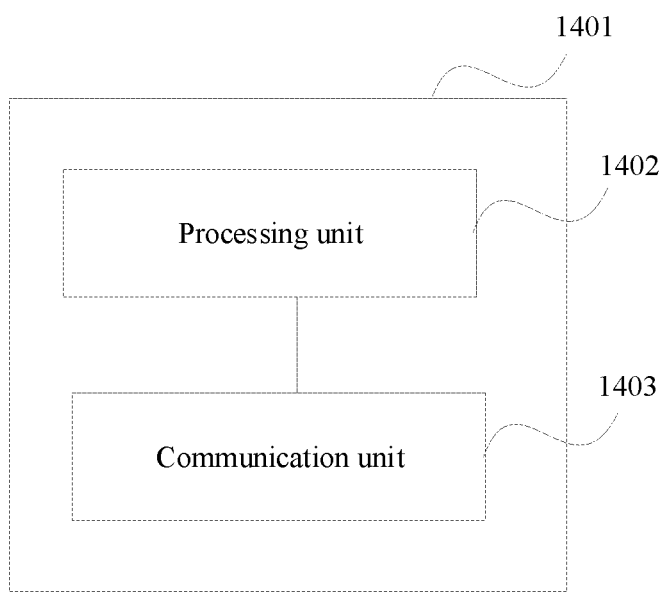
FIG. 14 is a schematic diagram of a communication apparatus according to an embodiment of this application.

Based on the foregoing embodiments and a same concept, FIG. 14 is a schematic diagram of an information processing apparatus according to an embodiment of this application. As shown in FIG. 14, the information processing apparatus 1401 may be a vehicular device or a road side device, or may be a chip or a circuit, for example, a chip or a circuit that may be disposed in the vehicular device or the road side device.

The information processing apparatus may implement the steps performed by the vehicular device (or the road side device) in any one or more corresponding methods shown in FIG. 5. The information processing apparatus may correspond to the vehicular device (or the road side device) in the foregoing method. The information processing apparatus may include a processing unit 1402 and a communication unit 1403.

When the information processing apparatus corresponds to the vehicular device in the foregoing method, the communication unit 1403 is configured to: receive a first message from a road side device, where the first message includes first position information of at least one first signal light, and the first message is a map MAP message or a signal phase and timing SPAT message; and the processing unit 1402 is configured to determine a position of a target signal light based on the first position information.

In a possible implementation, the first message is the MAP message, and the first position information is located in a Seq. of Connection field included in the MAP message.

In a possible implementation, the first message is the SPAT message, and the first position information is located in a Seq. of Phase field included in the SPAT message.

In a possible implementation, the first message is the SPAT message, the SPAT message further includes identification information of the at least one first signal light, and the communication unit 1403 is further configured to receive the MAP message from the road side device, where the MAP message includes the identification information.

In a possible implementation, a Seq. of IntersectionState field of the SPAT message includes the first position information and the identification information, and a Seq. of connection field of the MAP message includes the identification information.

In a possible implementation, the processing unit 1402 is further configured to: obtain second position information from a sensing device, where the second position information indicates a position of at least one second signal light; and determine the position of the target signal light based on the first position information and the second position information.

When the information processing apparatus corresponds to the road side device in the foregoing method, the processing unit 1402 is configured to generate a first message, where the first message includes position information of at least one signal light, and the first message is a map MAP message or a SPAT message; and the communication unit 1403 is configured to send the first message.

In a possible implementation, the first message is the MAP message, and the position information is located in a Seq. of Connection field of the MAP message.

In a possible implementation, the first message is the SPAT message, and the first position information is located in a Seq. of Phase field of the SPAT message.

In a possible implementation, the first message is the SPAT message, and the SPAT message further includes identification information of the at least one signal light; and the communication unit 1403 is further configured to send the MAP message, where the MAP message includes the identification information.

In a possible implementation, a Seq. of IntersectionState field of the SPAT message includes the first position information and the identification information, and a Seq. of connection field of the MAP message includes the identification information.

For concepts, explanations, detailed descriptions, and other steps that are involved in the information processing apparatus and that are related to the technical solutions provided in embodiments of this application, refer to the descriptions of the content in the foregoing method or other embodiments. Details are not described herein again.

It may be understood that for functions of the units in the information processing apparatus 1401, refer to an implementation of a corresponding method embodiment. Details are not described herein again.

It should be understood that division of the units of the information processing apparatus is merely logical function division. In actual implementation, all or some of the units may be integrated into one physical entity, or may be physically separated. In this embodiment of this application, the communication unit 1403 may be implemented by the transceiver 1203 in FIG. 12 or the communication interface 1303 in FIG. 13, and the processing unit 1402 may be implemented by the processor 1202 in FIG. 12 or the processor 1302 in FIG. 13.

According to the method provided in embodiments of this application, this application further provides a computer program product. The computer program product includes computer program code or an instruction. When the computer program code or the instruction is run on a computer, the computer is enabled to perform the method in any one of the embodiments shown in FIG. 5.

According to the method provided in embodiments of this application, this application further provides a computer-readable storage medium. The computer-readable medium stores program code. When the program code is run on a computer, the computer is enabled to perform the method in any one of the embodiments shown in FIG. 5.

According to the method provided in embodiments of this application, this application further provides a chip system. The chip system may include a processor. The processor is coupled to a memory, and may be configured to perform the method in the embodiment shown in FIG. 5. Optionally, the chip system further includes a memory. The memory is configured to store a computer program (which may also be referred to as code or an instruction). The processor is configured to invoke a computer program from the memory and run the computer program, so that a device on which the chip system is installed performs the method in any one of the embodiments shown in FIG. 5.

According to the method provided in embodiments of this application, this application further provides a system. The system includes the foregoing road side device and a vehicle, and a vehicular device is disposed in the vehicle; or includes the foregoing road side device and a vehicle, and a vehicular device is disposed in the vehicle.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedure or functions according to embodiments of this application are entirely or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a data subscriber line (DSL)) or wireless (for example, infrared, wireless, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state drive (SSD)), or the like.

It should be noted that a part of this patent application document includes copyright-protected content. The copyright owner reserves the copyright except copies are made for the patent documents or the recorded content of the patent documents in the Patent Office.

The road side end (for example, the first road side device or the second road side device) and the vehicular device in the foregoing apparatus embodiments correspond to the road side end (for example, the first road side device or the second road side device) and the vehicular device in the method embodiment, and a corresponding module or unit performs a corresponding step. For example, a communication unit (transceiver) performs a receiving or sending step in the method embodiment, and steps other than sending and receiving may be performed by a processing unit (processor). For a function of a specific unit, refer to a corresponding method embodiment. There may be one or more processors.

Terminologies such as "component", "module", and "system" used in this specification indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art may be aware that, in combination with illustrative logical blocks described in embodiments disclosed in this specification and steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in the form of a software product. The computer software product is stored in a storage medium and includes several instructions for instructing a computer device (which may be a personal computer, a server, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An information processing apparatus, comprising:
at least one processor; and one or more memories coupled to the at least one processor and storing programming instructions for execution by the at least one processor to:
receive a first message from a road side device, wherein the first message comprises first position information of at least one first signal light, and the first message is a MAP message or a signal phase and timing (SPAT) message;
determine a position of a target signal light based on the first position information;
obtain second position information from a sensing device, wherein the second position information indicates a position of at least one second signal light; and
determine the position of the target signal light based on the first position information and the second position information.

2. The apparatus according to claim 1, wherein in response to the first message being is a MAP message, and the first position information is located in a Seq. of Connection field of the MAP message.

3. The apparatus according to claim 1, wherein the first message is the SPAT message, the SPAT message further comprises identification information of the at least one first signal light, and the programming instructions are for execution by the at least one processor to:
receive the MAP message from the road side device, wherein the MAP message comprises the identification information.

4. The apparatus according to claim 3, wherein a Seq. of IntersectionState field of the SPAT message comprises the first position information and the identification information, and a Seq. of connection field of the MAP message comprises the identification information.

5. An information processing apparatus, comprising:
at least one processor; and
one or more memories coupled to the at least one processor and storing programming instructions for execution by the at least one processor to:
generate a first message, wherein the first message comprises first position information of at least one signal light, and the first message is a MAP message or a signal phase and timing (SPAT) message; and
send the first message, wherein:
the first position information is used to determine a position of a target signal light;
second position information is obtained, wherein the second position information indicates a position of at least one second signal light; and
the position of the target signal light is determined based on the first position information and the second position information.

6. The apparatus according to claim 5, wherein in response to the first message is the being a MAP message, and the position information is located in a Seq. of Connection field of the MAP message.

7. The apparatus according to claim 5, wherein the first message is the SPAT message, the SPAT message further comprises identification information of the at least one signal light, and the programming instructions are for execution by the at least one processor to:
send the MAP message, wherein the MAP message comprises the identification information.

8. The apparatus according to claim 7, wherein a Seq. of IntersectionState field of the SPAT message comprises the position information and the identification information, and a Seq. of connection field of the MAP message comprises the identification information.

9. An information processing method, wherein the method comprises:

receiving a first message from a road side device, wherein the first message comprises first position information of at least one first signal light, and the first message is a MAP message or a signal phase and timing (SPAT) message; and determining a position of a target signal light based on the first position information;

obtain second position information from a sensing device, wherein the second position information indicates a position of at least one second signal light; and determine the position of the target signal light based on the first position information and the second position information.

10. The method according to claim 9, wherein in response to the first message is the being a MAP message, and the first position information is located in a Seq. of Connection field of the MAP message.

11. The method according to claim 9, wherein the first message is the SPAT message, the SPAT message further comprises identification information of the at least one first signal light, and the method further comprises:

receiving the MAP message from the road side device, wherein the MAP message comprises the identification information.

12. The method according to claim 11, wherein a Seq. of IntersectionState field of the SPAT message comprises the first position information and the identification information, and a Seq. of connection field of the MAP message comprises the identification information.

13. The method according to claim 9, wherein the method further comprises:

obtaining second position information from a sensing device, wherein the second position information indicates a position of at least one second signal light; and wherein the determining a position of a target signal light based on the first position information comprises: determining the position of the target signal light based on the first position information and the second position information.

14. The apparatus according to claim 1, wherein the first message is the SPAT message, and the first position information is located in a Seq. of Phase field of the SPAT message.

15. The apparatus according to claim 5, wherein the first message is the SPAT message, and the position information is located in a Seq. of Phase field of the SPAT message.

16. The method according to claim 9, wherein the first message is the SPAT message, and the first position information is located in a Seq. of Phase field of the SPAT message.

* * * * *